United States Patent
Yonai et al.

(10) Patent No.: US 11,061,261 B2
(45) Date of Patent: Jul. 13, 2021

(54) OPTICAL MODULATOR, SUBSTRATE FOR OPTICAL MODULATOR, METHOD OF MANUFACTURING OPTICAL MODULATOR, AND METHOD OF MANUFACTURING SUBSTRATE FOR OPTICAL MODULATOR

(71) Applicant: THE JAPAN STEEL WORKS, LTD., Tokyo (JP)

(72) Inventors: Toshifumi Yonai, Tokyo (JP); Kazuhito Kishida, Tokyo (JP); Rinzo Kayano, Tokyo (JP); Satoru Ohsaki, Tokyo (JP); Kengo Ogawa, Tokyo (JP); Kouhei Kurimoto, Tokyo (JP); Hiroaki Yokota, Tokyo (JP); Shoji Kakio, Yamanashi (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 16/589,131

(22) Filed: Sep. 30, 2019

(65) Prior Publication Data

US 2020/0110291 A1 Apr. 9, 2020

(30) Foreign Application Priority Data

Oct. 3, 2018 (JP) .............................. JP2018-187893

(51) Int. Cl.
*G02F 1/035* (2006.01)
*G02F 1/03* (2006.01)

(52) U.S. Cl.
CPC ............ *G02F 1/035* (2013.01); *G02F 1/0305* (2013.01); *G02F 2202/20* (2013.01)

(58) Field of Classification Search
None
See application file for complete search history.

(56) References Cited

U.S. PATENT DOCUMENTS

| 5,446,330 | A | * | 8/1995 | Eda | ........................ | H03H 3/08 |
| | | | | | | 310/313 R |
| 5,491,762 | A | * | 2/1996 | Deacon | .................. | G02F 1/315 |
| | | | | | | 385/16 |

(Continued)

FOREIGN PATENT DOCUMENTS

JP 2017-129834 A 7/2017

OTHER PUBLICATIONS

Proceedings of electronics application session for graduation thesis presentation at University of Yamanashi, Faculty of Engineering, Department of Electronical and Electric Engineering, Feb. 20, 2018.

*Primary Examiner* — Rhonda S Peace
(74) *Attorney, Agent, or Firm* — SGPatents PLLC

(57) ABSTRACT

An optical modulator, a substrate for an optical modulator, a method of manufacturing an optical modulator, and a method of manufacturing a substrate for an optical modulator that can reduce a propagation loss are provided. An optical modulator 1 according to an embodiment includes: a base substrate 10; a waveguide substrate 20 disposed over the base substrate 10 and including an electro-optic effect; a waveguide 23 formed on the waveguide substrate 20 for performing optical modulation; and an electrode 40 configured to apply a voltage to the waveguide 23. Here, the base substrate 10 and the waveguide substrate 20 are made of the same material, the waveguide 23 is formed inside the waveguide substrate 20, and a refractive index of the waveguide substrate 20 is larger than a refractive index of the base substrate 10.

23 Claims, 24 Drawing Sheets

(56) References Cited

U.S. PATENT DOCUMENTS

| | | | |
|---|---|---|---|
| 7,389,030 B2* | 6/2008 | Mitomi | G02F 1/035 385/129 |
| 7,873,244 B2* | 1/2011 | Kinpara | G02F 1/2255 385/2 |
| 2002/0106141 A1* | 8/2002 | Gopalakrishnan | G02F 1/0356 385/2 |
| 2007/0147722 A1* | 6/2007 | Kondo | G02F 1/2255 385/2 |
| 2017/0052424 A1 | 2/2017 | Iwatsuka et al. | |
| 2018/0188629 A1 | 7/2018 | Iwatsuka et al. | |
| 2019/0079366 A1 | 3/2019 | Iwatsuka et al. | |
| 2020/0110291 A1* | 4/2020 | Yonai | G02F 1/0305 |

* cited by examiner

OPTICAL MODULATOR, SUBSTRATE FOR OPTICAL MODULATOR, METHOD OF MANUFACTURING OPTICAL MODULATOR, AND METHOD OF MANUFACTURING SUBSTRATE FOR OPTICAL MODULATOR

INCORPORATION BY REFERENCE

This application is based upon and claims the benefit of priority from Japanese patent application No. 2018-187893, filed on Oct. 3, 2018, the disclosure of which is incorporated herein in its entirety by reference.

BACKGROUND

The present disclosure relates to an optical modulator, a substrate for an optical modulator, a method of manufacturing an optical modulator, and a method of manufacturing a substrate for an optical modulator. For example, the present disclosure relates to an optical modulator, a substrate for an optical modulator, a method of manufacturing an optical modulator, and a method of manufacturing a substrate for an optical modulator used in optical communication.

Japanese Unexamined Patent Application Publication No. 2017-129834 discloses an optical waveguide element and an optical modulator using the same.

CITATION LIST

Non Patent Literature 1: Proceedings of electronics application session for graduation thesis presentation at University of Yamanashi, Faculty of Engineering, Department of Electronical and Electric Engineering, Feb. 20, 2018.

SUMMARY

A titanium diffusion layer which functions as a waveguide contains an impurity such as titanium. It is thus difficult for the titanium diffusion layer to reduce a propagation loss of guided light due to the impurity. Further, in order to diffuse heat of a metal such as titanium, for example, a heat treatment at a high temperature of 1000 [° C.] or higher for a long time is required. When such a high temperature heat treatment is applied for a long time, an impurity that causes a propagation loss of guided light may be introduced.

In an optical modulator having a heterojunction structure in which a lithium niobate layer is epitaxially grown over a sapphire substrate or the like, it may be difficult to reduce the propagation loss when a difference between a refractive index of the substrate and that of the lithium niobate layer is large.

Other problems and novel features will be apparent from the descriptions of the present specification and the attached drawings.

An optical modulator according to an embodiment includes: a base substrate; a waveguide substrate disposed over the base substrate and including an electro-optic effect; a waveguide formed on the waveguide substrate for performing optical modulation; and an electrode configured to apply a voltage to the waveguide. Here, the base substrate and the waveguide substrate are made of the same material, the waveguide is formed inside the waveguide substrate, and a refractive index of the waveguide substrate is larger than a refractive index of the base substrate.

A substrate for an optical modulator according to the embodiment includes: a first substrate; and a second substrate which is disposed over the first substrate, in which a waveguide for performing optical modulation is formed, and which includes an electro-optic effect. Here, the first and second substrates are made of the same material, and a refractive index of the second substrate is larger than a refractive index of the first substrate.

A method of manufacturing an optical modulator according to the embodiment includes: (a) preparing a substrate obtained by bonding a second substrate including an electro-optic effect onto a first substrate; (b) forming a ridge structure to be a waveguide for performing optical modulation on the second substrate; and (c) forming an electrode for applying a voltage to the waveguide over the ridge structure. Here, the first and second substrates are made of the same material, and a refractive index of the second substrate is larger than a refractive index of the first substrate.

A method of manufacturing a substrate for an optical modulator according to the embodiment includes: (a) preparing a first substrate; (b) preparing a second substrate including a refractive index larger than that of the first substrate and including an electro-optic effect; and (c) bonding the second substrate onto the first substrate. Here, the first and second substrates are made of the same material, and a waveguide for performing optical modulation can be formed inside the second substrate.

According to the above example aspects, it is possible to provide an optical modulator, a substrate for an optical modulator, a method of manufacturing an optical modulator, and a method of manufacturing a substrate for an optical modulator that can reduce a propagation loss.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

As related studies, the inventors of the present application have reported on an optical modulator having a heterojunction structure in graduation thesis presentation at University of Yamanashi, Faculty of Engineering, Department of Electronical and Electric Engineering, prior to the present application (see Non-Patent literature 1). The provision for "exceptions to lack of novelty of invention" should be applied to the optical modulator reported on in the presentation.

The following descriptions and drawings are omitted and simplified as appropriate for clarity of the descriptions.

Throughout the drawings, the same components are denoted by the same reference signs and repeated descriptions will be omitted as appropriate.

Embodiment

An optical modulator according to an embodiment will be described. First, a configuration and members of the optical modulator will be described. After that, an operation of the optical modulator will be described, and a method of manufacturing a substrate for an optical modulator used in the optical modulator and a method of manufacturing an optical modulator will be described.
<Structure of Optical Modulator>

Figure 1:
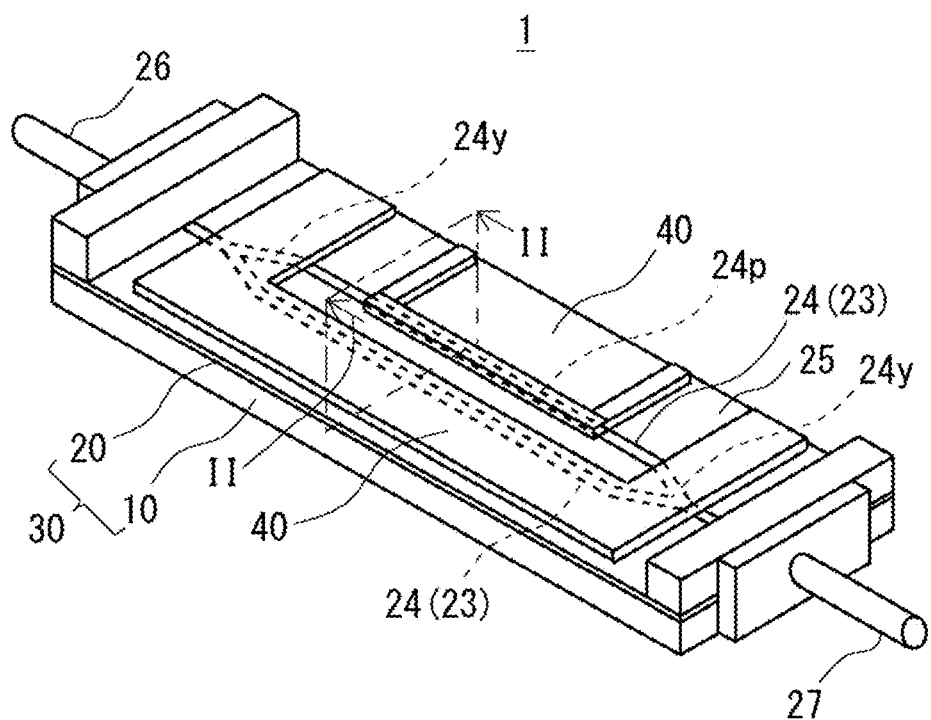
FIG. 1 is a perspective view showing an example of an optical modulator according to an embodiment.
Figure 2:
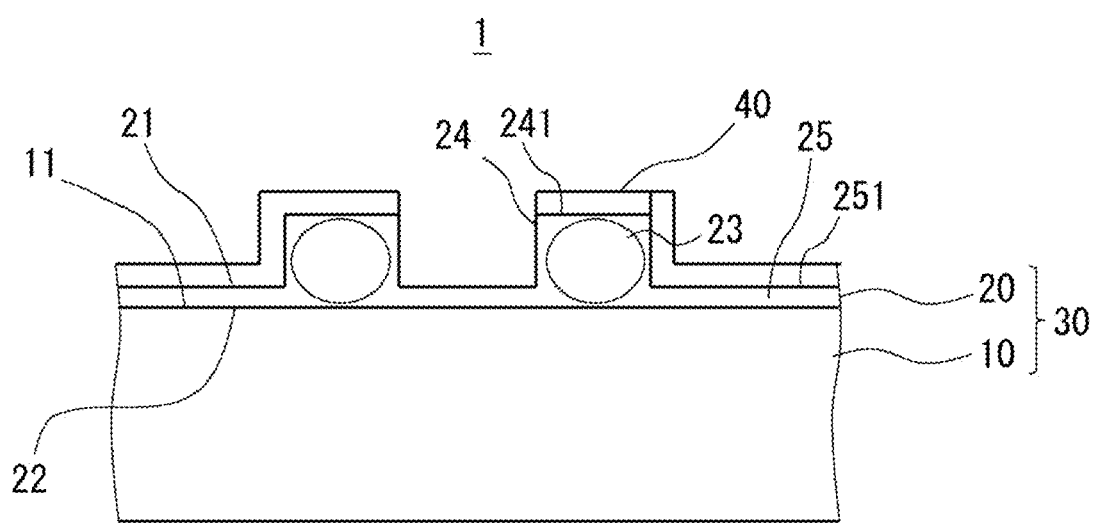
FIG. 2 is a cross-sectional view showing an example of the optical modulator according to the embodiment and showing a cross section taken along the line II-II in FIG. 1.
Figure 3:
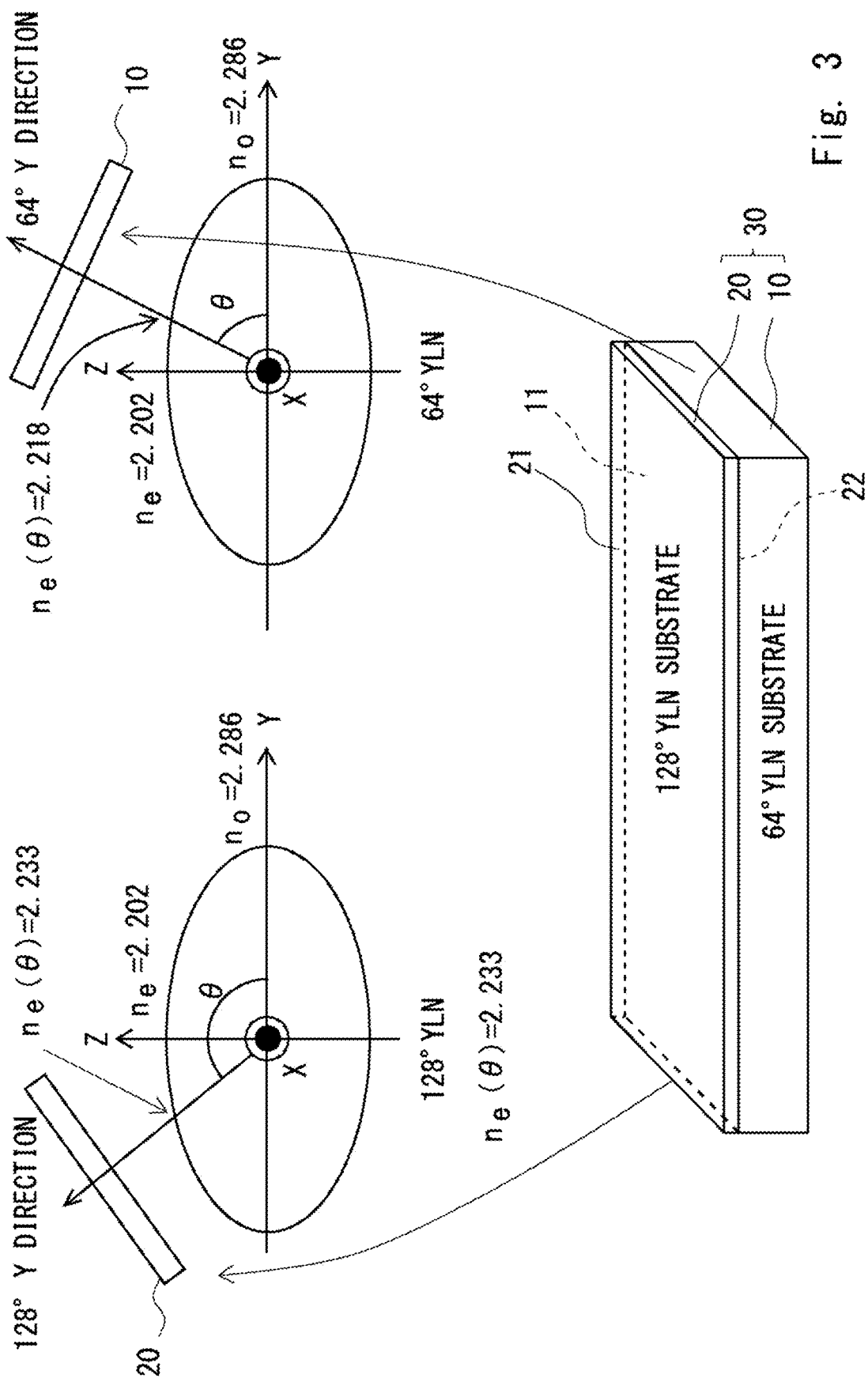
FIG. 3 is a perspective view showing an example of a substrate for an optical modulator according to the embodiment.

FIG. 1 is a perspective view showing an example of an optical modulator according to the embodiment. FIG. 2 is a cross-sectional view showing an example of the optical modulator according to the embodiment and shows a cross section taken along the line II-II of FIG. 1. FIG. 3 is a perspective view showing an example of a substrate for an optical modulator according to the embodiment. As shown in FIGS. 1 to 3, the optical modulator 1 includes a base substrate 10, a waveguide substrate 20, and an electrode 40. The base substrate 10 and the waveguide substrate 20 are collectively referred to as a substrate 30 for an optical modulator. Hereinafter, respective members constituting the optical modulator 1 will be described.
<Substrate for Optical Modulator>

The substrate 30 for an optical modulator includes the base substrate 10 and the waveguide substrate 20 disposed over the base substrate 10. The base substrate 10 is, for example, a rectangular flat plate and has a flat upper surface 11. The waveguide substrate 20 is, for example, a rectangular flat plate and is disposed over the upper surface 11 of the base substrate 10. The waveguide substrate 20 includes a ridge structure 24 on an upper surface 21. The base substrate 10 and the waveguide substrate 20 are bonded to each other. Specifically, a lower surface 22 of the waveguide substrate 20 is bonded to the upper surface 11 of the base substrate 10. For example, the base substrate 10 and the waveguide substrate 20 are bonded by covalent bonding.

Preferably, the base substrate 10 and the waveguide substrate 20 are made of the same material. For example, the base substrate 10 and the waveguide substrate 20 are made of lithium niobate ($LiNbO_3$). The shapes of the base substrate 10 and the waveguide substrate 20 are not limited to rectangular as long as the waveguide substrate 20 can be disposed over the base substrate 10. The material of the base substrate 10 and the waveguide substrate 20 is not limited to lithium niobate, and may instead be, for example, lithium tantalate ($LiTaO_3$).

The base substrate 10 and the waveguide substrate 20 being made of the same material means that the base substrate 10 and the waveguide substrate 20 contain the same material and may also contain another unavoidable material(s) other than the same material. Further, the base substrate 10 and the waveguide substrate 20 being made of lithium niobate means that the base substrate 10 and the waveguide substrate 20 may contain lithium niobate and may also contain another unavoidable material(s) other than lithium niobate.
<Lithium Niobate Crystal: Crystal Cut>

As shown in FIG. 3, when the base substrate 10 and the waveguide substrate 20 are made of lithium niobate crystal, the base substrate 10 and the waveguide substrate 20 have a predetermined crystal cut angle. The lithium niobate crystal has crystal axes of an X axis, a Y axis, and a Z axis. The Z axis is an optical axis. A refractive index of extraordinary light $n_e$ sensed by polarized light (light having an electric field amplitude parallel to the Z axis) parallel to the Z axis, which is the optical axis, is 2.202. A refractive index of ordinary light $n_O$ sensed by polarized light (light having an electric field amplitude parallel to the Y axis) orthogonal to the Z axis is 2.286.

In an YZ plane including the Y axis and the Z axis, a direction in which an angle θ formed with the +Y axis is 64 [°] is referred to as a 64° Y direction. Note that the angle θ is an angle measured from the +Y axis in a rotational direction of a screw advancing in the +X axis direction in the YZ plane. Further, a substrate of a lithium niobate crystal that is cut in such a way that a plane orthogonal to the 64° Y direction is a cut plane is referred to as a 64° YLN substrate. That is, a crystal cut angle of the 64° YLN substrate is 64 [°], and a direction orthogonal to an upper surface of the 64° YLN substrate is a 64° Y direction.

Likewise, in the YZ plane, a direction in which the angle θ formed with the +Y axis is 128° is referred to as a 128° Y direction. A substrate of a lithium niobate crystal that is cut in such a way that a plane orthogonal to the 128° Y direction is a cut plane is referred to as a 128° YLN substrate. That is, a crystal cut angle of the 128° YLN substrate is 128 [°], and a direction orthogonal to an upper surface of the 128° YLN substrate is the 128° Y direction.

Furthermore, a substrate of a lithium niobate crystal that is cut in such a way that a plane orthogonal to the Y axis direction is a cut plane is referred to as a Y-cut LN substrate. A direction orthogonal to an upper surface of the Y-cut LN substrate is the Y axis direction. A substrate of a lithium niobate crystal that is cut in such a way that a plane orthogonal to the Z axis direction is a cut plane is referred to as a Z cut LN substrate. A direction orthogonal to an upper surface of the Z cut LN substrate is the Z axis direction.

Figure 4:
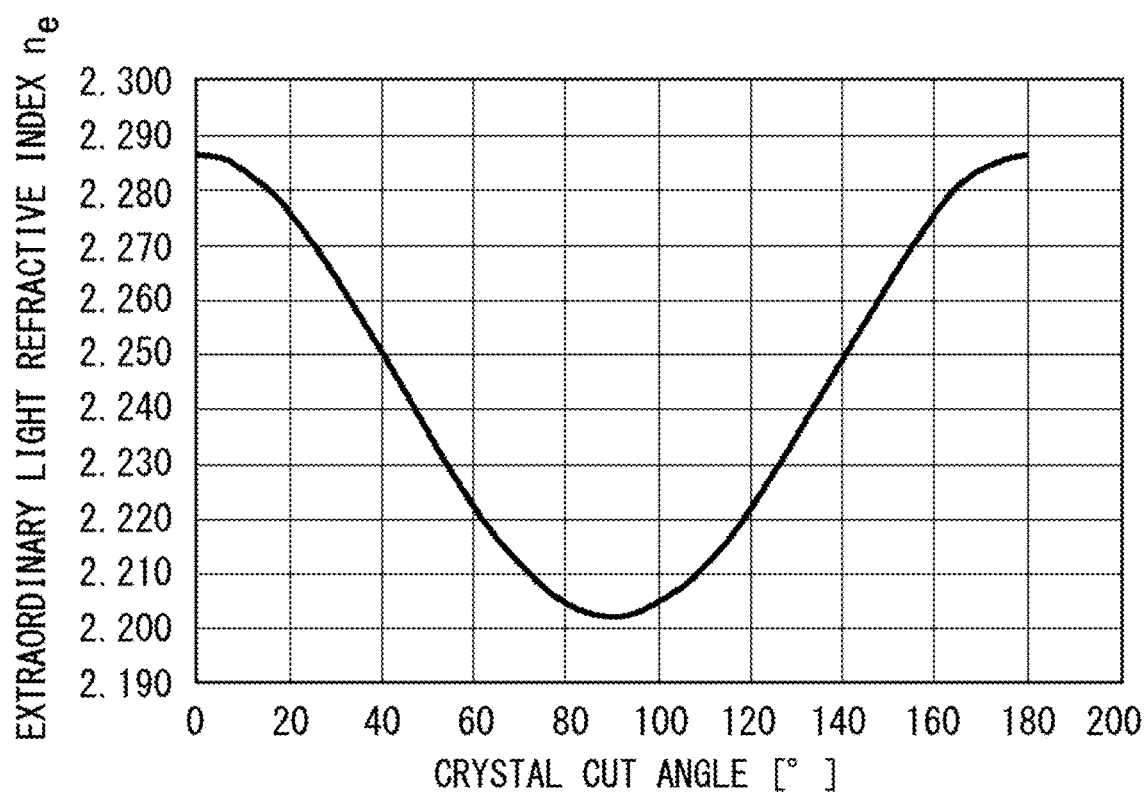
FIG. 4 is a diagram showing an example of a refractive index of extraordinary light $n_e$ of a substrate of a lithium niobate crystal, where the horizontal axis represents a crystal cut angle, and the vertical axis represents the refractive index of extraordinary light $n_e$.

FIG. 4 is a diagram showing an example of the refractive index of extraordinary light $n_e$ of a substrate of a lithium niobate crystal. In FIG. 4, the horizontal axis represents a crystal cut angle, and the vertical axis represents the refractive index of extraordinary light $n_e$. That is, the vertical axis represents the refractive index sensed by the polarized light parallel to the direction orthogonal to the upper surface of the crystal cut substrate. As shown in FIG. 4, the refractive index of extraordinary light $n_e$ of the substrate of a lithium niobate crystal is 2.286 when the crystal cut angle is 0 [°], which indicates a refractive index of ordinary light $n_O$ of the Y axis. When the crystal cut angle is between 0 and 90 [°], the larger the angle is, the smaller the refractive index of extraordinary light $n_e$ of the substrate of a lithium niobate crystal becomes. For example, when the crystal cut angle is 64 [°], the refractive index of extraordinary light $n_e$ is 2.218. Note that the refractive index of extraordinary light $n_e$ is also simply referred to as a refractive index.

When the crystal cut angle is 90 [°], the refractive index of extraordinary light $n_e$ is 2.202. When the crystal cut angle is 90 to 180 [°], the larger the crystal cut angle, the larger the refractive index of the substrate of a lithium niobate crystal becomes. When the crystal cut angle is 128 [°], the refractive index of extraordinary light $n_e$ is 2.233.
<Base Substrate: Crystal Cut and Refractive Index>

In this embodiment, the crystal cut angle of the base substrate 10 is, for example, 57 [°] to 123 [°]. In this case, the refractive index of extraordinary light $n_e$ is 2.202 to 2.226. By setting the crystal cut angle of the base substrate 10 to such an angle, the refractive index of the base substrate 10 can be set within a range in which the refractive index of the base substrate 10 does not become larger than the refractive index of the waveguide substrate 20. Thus, the guided light can be propagated to the waveguide substrate 20. Preferably, the crystal cut angle of the base substrate 10 is 64 [°], and the refractive index of extraordinary light $n_e$ is 2.218. In this case, the upper surface 11 of the base substrate 10 is orthogonal to the 64° Y direction.

<Waveguide Substrate: Crystal Cut and Refractive Index>

The crystal cut angle of the waveguide substrate 20 is, for example, 124 to 132 [°]. In this case, the refractive index of extraordinary light $n_e$ is 2.227 to 2.239. By setting the crystal cut of the waveguide substrate 20 to such an angle, the electro-optic constant of the waveguide substrate 20 can be set within the range greater than 0 [°] (Z axis) within a range in which the refractive index of the base substrate 10 does not become greater than the refractive index of the waveguide substrate 20. Preferably, the crystal cut angle of the waveguide substrate 20 is 128 [°], and the refractive index of extraordinary light $n_e$ is 2.233. In this case, the upper surface 11 of the waveguide substrate 20 is orthogonal to the 128° Y direction.

In this manner, the crystal cut angle of the base substrate 10 differs from that of the waveguide substrate 20. Further, the refractive index of the waveguide substrate 20 is greater than the refractive index of the base substrate 10.

<Waveguide Substrate: Electro-Optic Constant>

The waveguide substrate 20 has an electro-optic effect. The electro-optic effect refers to a phenomenon that occurs when light interacts with an electric field and a substance that is affected by the electric field, for example, like the Pockels effect. The electro-optic effect is, for example, when an electric field is applied to the waveguide substrate 20, the refractive index of the waveguide substrate 20 changes.

Figure 5:
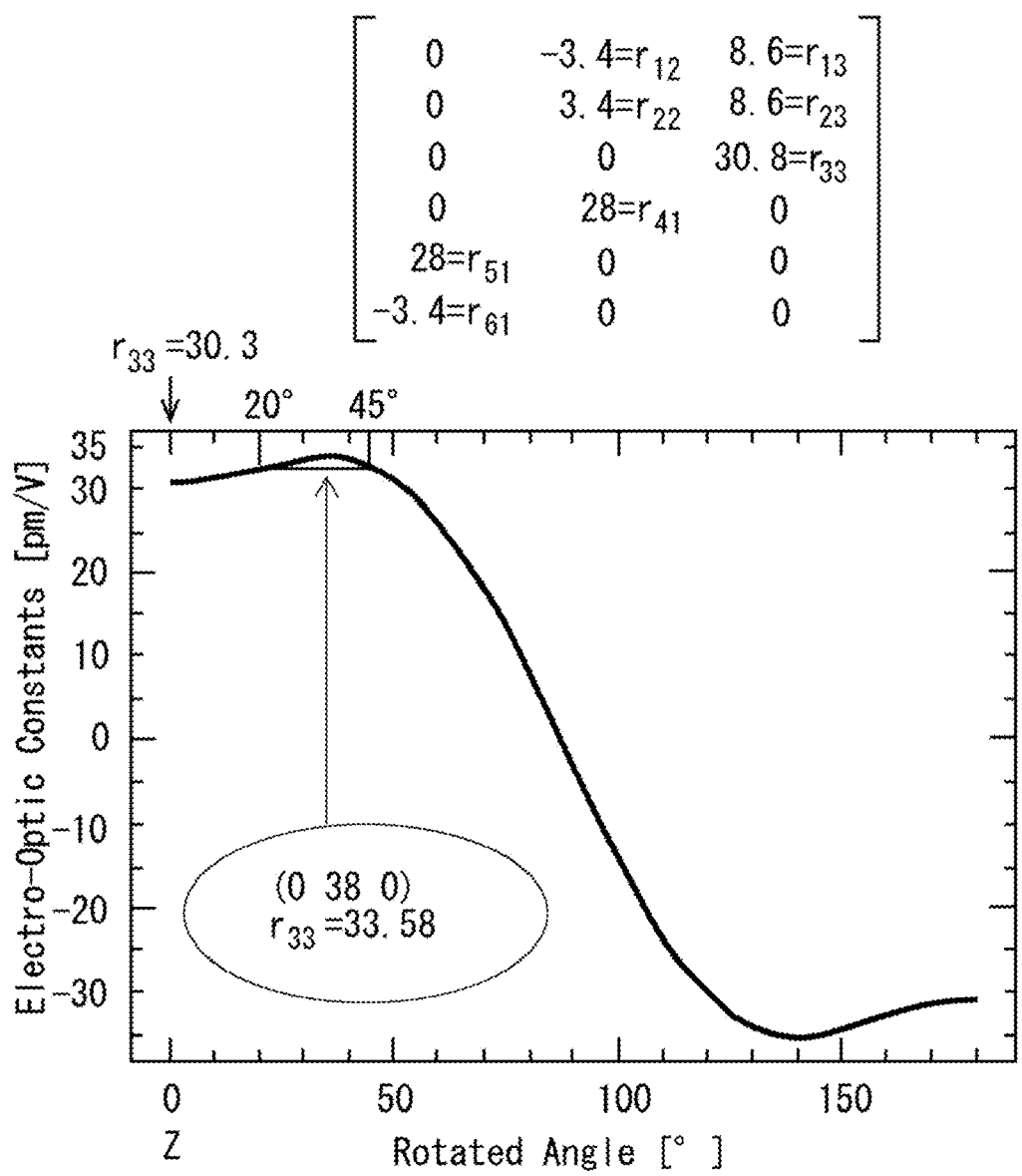
FIG. 5 is a graph showing an example an electro-optic constant of a substrate of a Y-cut lithium niobate crystal, where the horizontal axis represents an angle formed with the Z axis, and the vertical axis represents the electro-optic constant.

FIG. 5 is a graph showing an example the electro-optic constant of a substrate of a Y-cut lithium niobate crystal. In FIG. 5, the horizontal axis represents an angle formed with the Z axis, and the vertical axis represents the electro-optic constant. Commonly, the electro-optic constant of a nonlinear optical member changes with the orientation of a crystal. For example, the angle formed with the Z axis is 0 [°], namely, the electro-optic constant $r_{33}$ (30.8) in the Z axis direction is large. As shown in FIG. 5, in the case of a substrate of a Y-cut lithium niobate crystal, the electro-optic constant $r^S_{33}$ manifests a high value of 32.5 to 34 [pm/V] when the angle formed with the +Z axis is 20 to 45 [°]. When the angle formed with the +Z axis is 38 [°], the electro-optic constant $r^S_{33}$ manifests especially a high value of 33.58. The case in which the angle formed with the +Z axis is 20 to 45 [°] corresponds to the case in which the angle formed with the +Y axis is 110 to 135 [°]. The case in which the angle formed with the +Z axis is 38 [°] corresponds to the case in which the angle formed with the +Y axis is 128 [°]. The crystal cut angle of the waveguide substrate 20 according to this embodiment is in a range in which the electro-optic constant is greater than 0 [°] (Z axis), and the refractive index of the waveguide substrate 20 is in a range in which the refractive index of the waveguide substrate 20 is larger than the refractive index of the base substrate 10.

Figure 6:
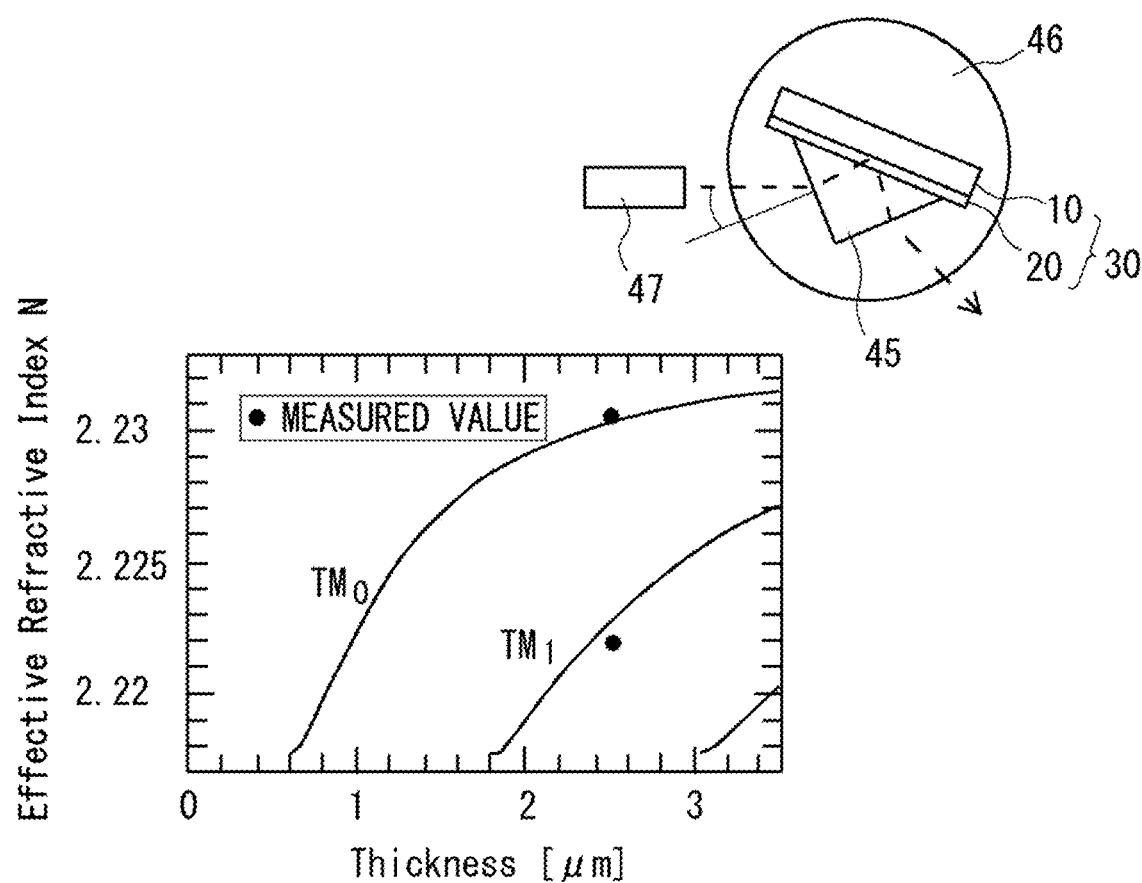
FIG. 6 is a graph showing an example of the refractive index of a waveguide substrate disposed over a base substrate in the optical modulator 1 according to the embodiment, where the horizontal axis represents a thickness of the waveguide substrate, and the vertical axis represents the effective refractive index of the extraordinary light $n_e$.

FIG. 6 is a graph showing an example of the refractive index of the waveguide substrate 20 disposed over the base substrate 10 in the optical modulator 1 according to the embodiment. In FIG. 6, the horizontal axis represents a thickness of the waveguide substrate 20, and the vertical axis represents the effective refractive index the extraordinary light $n_e$ (refractive index sensed by guided light). FIG. 6 also shows a schematic diagram of the prism coupler method. The base substrate 10 is a 64° YLN substrate. The waveguide substrate 20 is a 128° YLN substrate. The solid lines indicate simulation results of the zero-order mode $TM_0$ and the first-order mode $TM_1$. Black dots indicate values measured using the waveguide substrate 20 with a thickness of 2.5 [μm]. The prism coupler method is used for the measurement. The prism coupler method is a method of measuring the effective refractive index of the waveguide substrate 20 through a prism 45. Specifically, the prism 45 is disposed over the waveguide substrate 20 side in the substrate 30 for an optical modulator which is disposed over a rotation stage 46, and an incident angle is changed while irradiating the waveguide substrate 20 with a He—Ne laser 47 to thereby measure the effective refractive index when light is guided.

As shown in FIG. 6, the zero-order mode $TM_0$ and the first-order mode $TM_1$ are confirmed inside the waveguide substrate 20. Thus, it can be confirmed that the substrate 30 for an optical modulator functions as a planar optical waveguide. Therefore, by employing a homogeneous junction structure in a channel optical waveguide, a propagation loss in the waveguide can be made small.

<Waveguide Substrate: Ridge Structure>

As shown in FIG. 2, the waveguide substrate 20 includes the ridge structure 24 on, for example, the upper surface 21. In the ridge structure 24, a projection projecting from the upper surface 21 extends in a rail shape on the upper surface 21. A part of the waveguide substrate 20 other than the ridge structure 24 is referred to as a slab part 25. An upper surface 241 of the ridge structure 24 and an upper surface 251 of the slab part 25 are, for example, flat surfaces.

Figure 7:
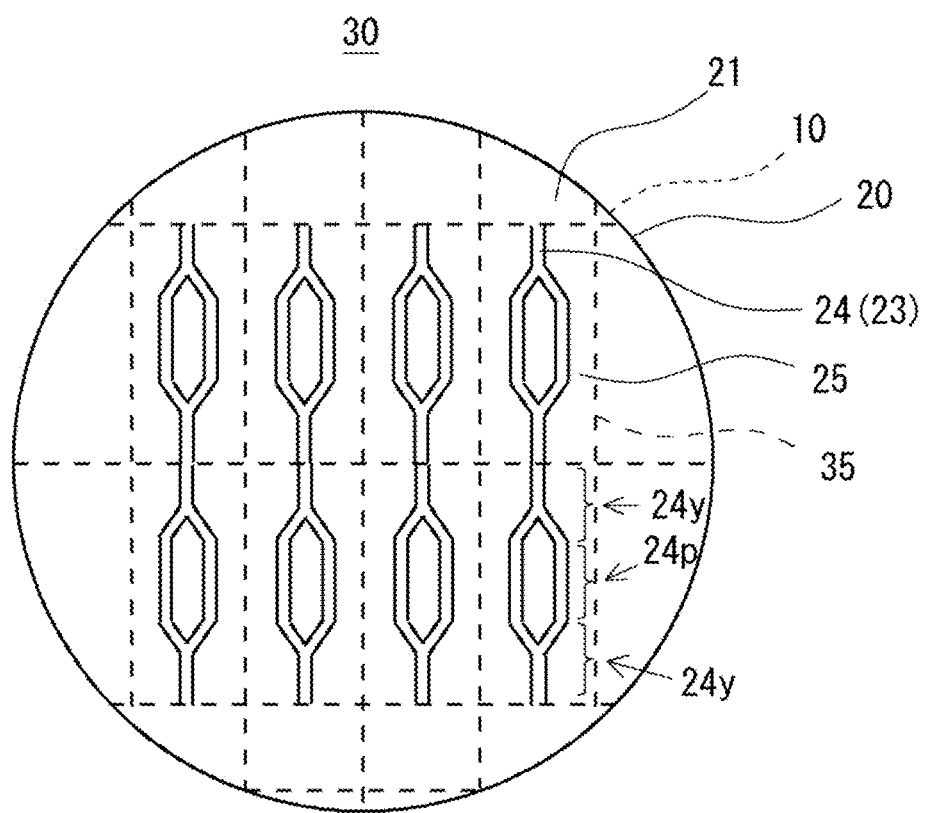
FIG. 7 is a top view showing an example of a wafer-shaped substrate for an optical modulator in the optical modulator according to the embodiment.

FIG. 7 is a top view showing an example of a wafer-shaped substrate 30 for an optical modulator in the optical modulator 1 according to the embodiment. As shown in FIG. 7, the wafer-shaped substrate 30 for an optical modulator includes a wafer-shaped waveguide substrate 20 disposed over a wafer-shaped base substrate 10. A plurality of ridge structures 24 are formed on the upper surface 21 of the waveguide substrate 20. The wafer-shaped substrate 30 for an optical modulator is cut into a plurality of chip-shaped optical modulator substrates 30 along cutting lines 35 through predetermined processing.

When simply the term modulator substrate 30 is used, it indicates both the wafer-shaped substrate 30 for an optical modulator and the chip-shaped substrate 30 for an optical modulator. In order to specify one of the wafer-shaped substrate 30 for an optical modulator and the chip-shaped substrate 30 for an optical modulator, they are distinguished by being referred to as the wafer-shaped substrate 30 for an optical modulator or the chip-shaped substrate 30 for an optical modulator, respectively. Similarly, each of the base substrate 10 and the waveguide substrate 20 are prefixed with wafer-shaped or chip-shaped when they are distinguished between the wafer-shaped or chip-shaped substrates.

When viewed from the upper surface 21 side, the upper surface 21 of the waveguide substrate 20 includes a Y-shaped part 24y and a parallel part 24p. In the Y-shaped part 24, the ridge structure 24 extending in one direction is branched in a Y-shape, and in the parallel part 24p, two ridge structures 24 extending in one direction are arranged in parallel.

<Waveguide>

A waveguide 23 for optical modulation is formed in the waveguide substrate 20. That is, the waveguide 23 is formed inside the waveguide substrate 20. When the waveguide substrate 20 includes the ridge structure 24, the waveguide 23 is formed inside the ridge structure 24. The waveguide 23 propagates guided light.

<Electrode>

The electrode 40 for applying a voltage to the waveguide 23 is disposed in the vicinity of the waveguide 23. For example, the electrode 40 is disposed over the ridge structure 24. The electrode 40 may not be disposed over the ridge structure 24 and may instead be disposed between adjacent ridge structures as long as it can apply a voltage to the waveguide 23.

<Others>

An input terminal 26 connected to the waveguide 23 is connected to one end of the waveguide substrate 20. Further, an output terminal 27 connected to the waveguide 23 is connected to the other end of the waveguide substrate 20.

<Operation>

Next, an operation of the optical modulator 1 according to the embodiment will be described. First, conversion of an electro-optical signal for converting an electrical signal into an optical signal will be described as an example of the operation of the optical modulator 1. After that, a simulation of an operation of the waveguide in the ridge structure, a simulation of a mode dispersion curve of guided light, and a simulation of a BPM analysis will be described.

<Conversion of Electro-Optical Signal>

Input light input from the input terminal 26 of the optical modulator 1 is branched at the Y-shaped part 24y. For example, each of the branched input light beams becomes ½. The beams of branched input light pass through respective two waveguides in the parallel part 24p. Then, the beams of branched input light are combined at the Y-shaped part 24y. The combined light is output from the output terminal 27.

The electrodes 40 are disposed respectively over the two waveguides 23 in the parallel part 24p. When an inter-electrode voltage between the electrode 40 over one waveguide 23 and the electrode 40 over the other waveguide 23 is, for example, a predetermined voltage $V_0$, control is performed so that no phase difference is generated between the two waveguides 23. Specifically, the refractive index is changed so that no phase difference occurs between the two waveguides 23. Then, the beams of light combined at the Y-shaped part 24y on the output side add up to become one. On the other hand, when the inter-electrode voltage is, for example, a predetermined voltage $V_1$, control is performed so that a phase difference is generated between the two waveguides 23. Specifically, the refractive index is changed by the voltage $V_1$ so that a phase difference of 180 [°] is generated between the two waveguides 23. By doing so, the beams of light combined at the Y-shaped part 24y on the output side cancel each other. Thus, the light output from the output terminal 27 becomes zero.

For example, when the inter-electrode voltage is changed using the voltages $V_0$ and $V_1$, output light output from the output terminal 27 can be a pulse signal of 0 and 1. In this manner, the optical modulator 1 can convert an electrical signal into an optical signal using input light.

<Simulation of Operation of Waveguide in Ridge Structure>

Figure 8:
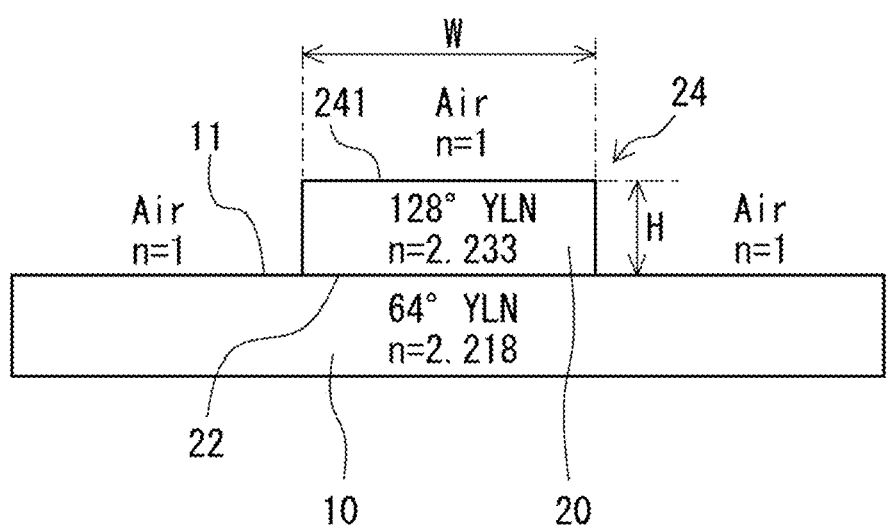
FIG. 8 is a diagram showing an example of an analysis model when a cutoff property for a width and a thickness of a ridge structure is simulated in the optical modulator according to the embodiment.

FIG. 8 is a diagram showing an example of an analysis model when a cutoff property for a width W and a thickness H of the ridge structure 24 is simulated in the optical modulator 1 according to the embodiment. As shown in FIG. 8, it is assumed that a 128° YLN substrate is disposed over a 64° YLN substrate. The refractive index of extraordinary light $n_e$ of the 64° YLN substrate is 2.218, and the refractive index of extraordinary light $n_e$ of the 128° YLN substrate is 2.233. It is assumed that the ridge structure 24 is composed of a 128° YLN substrate. The width W of the ridge structure 24 is a length of the ridge structure 24 in a direction orthogonal to the direction in which the ridge structure 24 extends in a plane parallel to the upper surface 11 of the base substrate 10. The thickness H of the ridge structure 24 is a length of the ridge structure 24 from the lower surface 22 of the waveguide substrate 20 to the upper surface 241 of the ridge structure 24 in the direction orthogonal to the upper surface 11. It is assumed that an upper part and side parts of the ridge structure 24 are covered with air having a refractive index of 1.

Figure 9:
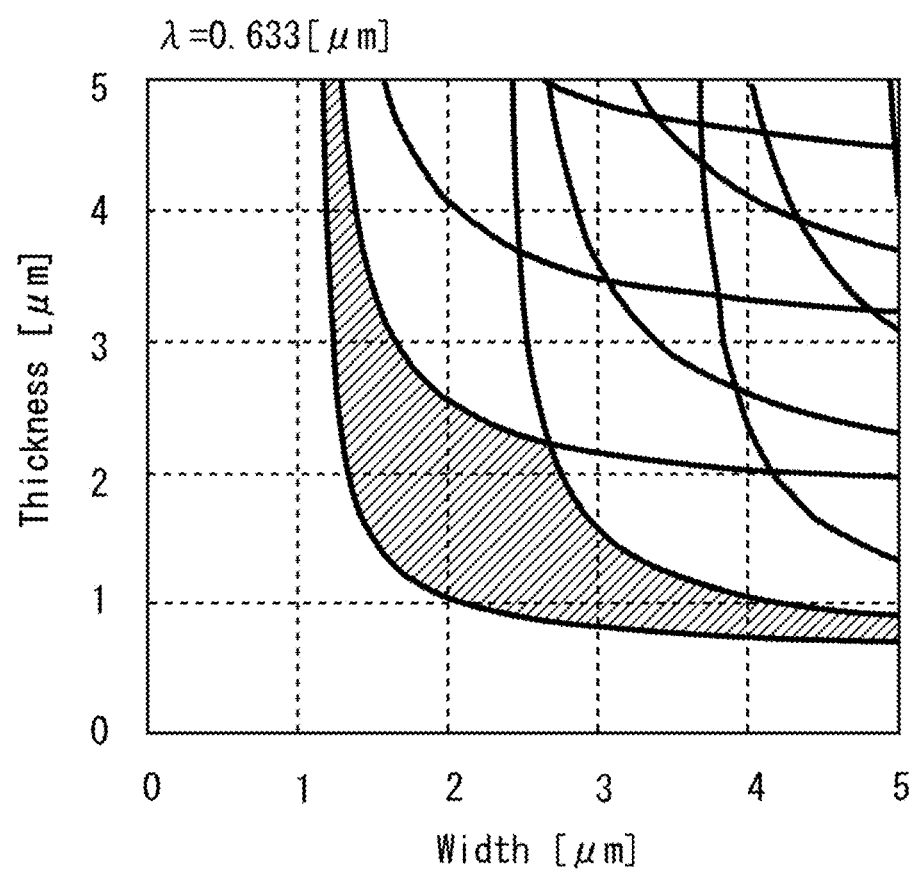
FIG. 9 is a graph showing an example of a result obtained in a simulation of the cut-off property for the width and the thickness of the ridge structure in the optical modulator according to this embodiment, where the horizontal axis represents the width of the ridge structure, and the vertical axis represents the thickness of the ridge structure.
Figure 10:
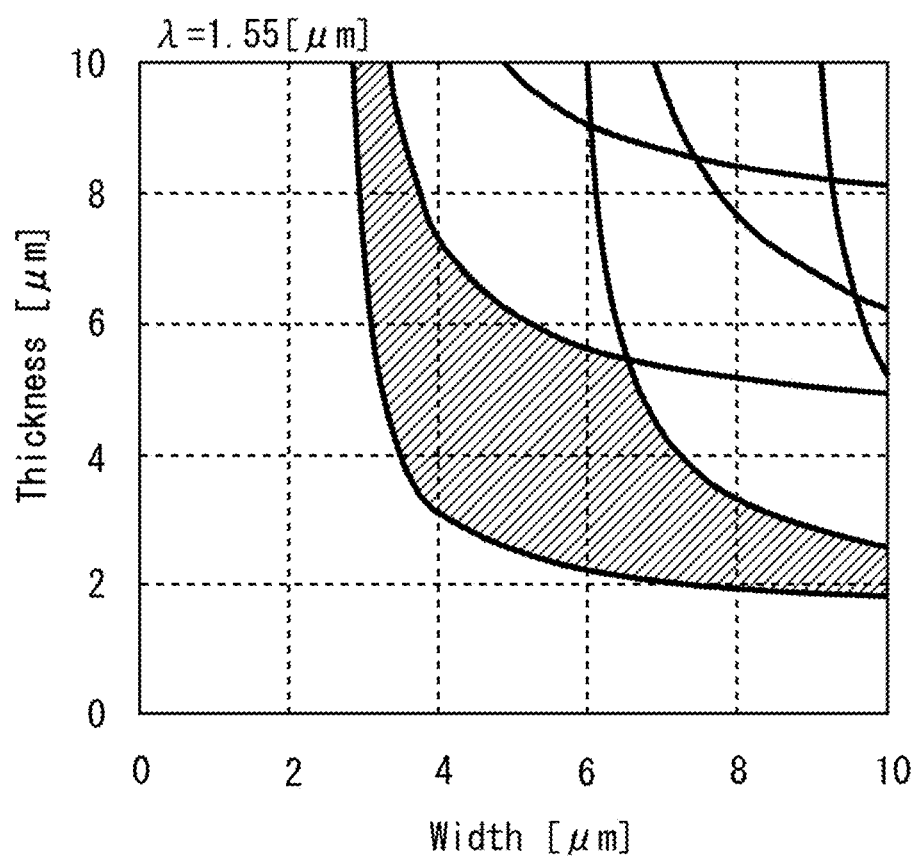
FIG. 10 is a graph showing an example of a result obtained in a simulation of the cut-off property for the width and the thickness of the ridge structure in the optical modulator according to this embodiment, where the horizontal axis represents the width of the ridge structure, and the vertical axis represents the thickness of the ridge structure.

FIGS. 9 and 10 are graphs showing examples of results obtained in a simulation of the cut-off property for the width W and the thickness H of the ridge structure 24 in the optical modulator 1 according to this embodiment. In FIGS. 9 and 10, the horizontal axis represents the width W of the ridge structure 24, and the vertical axis represents the thickness H of the ridge structure 24. A wavelength λ of guided light used for the simulation is 0.633 [μm] in FIG. 9 and 1.55 [μm] in FIG. 10.

As shown in FIG. 9, when the wavelength λ of the guided light is 0.633 [μm], only the zero-order mode $TM_0$ propagates in a single mode in the shaded part. As propagation conditions, the width W of the ridge structure 24 is preferably 2.0 [μm], and a thickness T is preferably 2.0 [μm]. As shown in FIG. 10, when the wavelength λ, of the guided light is 1.55 [μm], as the propagation conditions, the width W of the ridge structure 24 is preferably 5.0 [μm] and the thickness T is preferably 5.0 [μm].

<Simulation of Mode Dispersion Curve of Guided Light>

Figure 11:
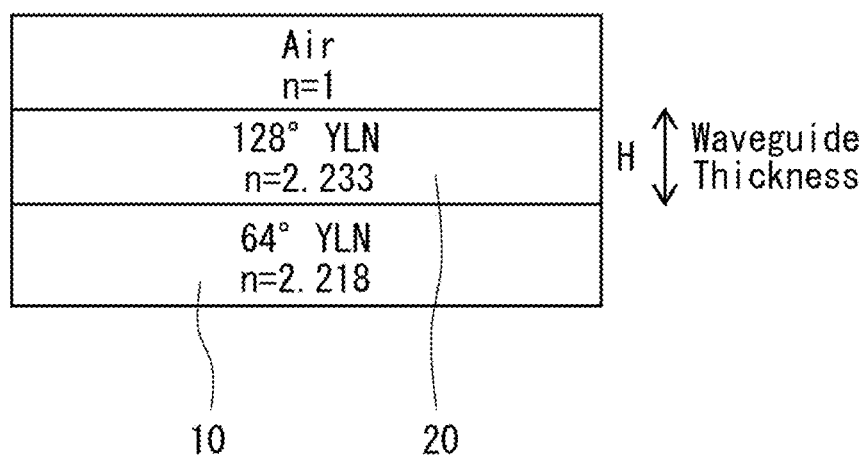
FIG. 11 is a diagram showing an example of an analysis model when a mode dispersion curve of guided light is obtained in a simulation in the optical modulator according to the embodiment.

Next, a relationship between the thickness of the waveguide 23 in the ridge structure 24 and the effective refractive index is derived. FIG. 11 is a diagram showing an example of an analysis model when the mode dispersion curve of guided light is obtained in a simulation in the optical modulator according to the embodiment. As shown in FIG. 11, the relationship between the effective refractive index and the thickness H of the 128° YLN substrate serving as the waveguide 23 is calculated using an analysis model in which a 64° YLN substrate, a 128° YLN substrate, and air are stacked in order from the bottom.

Figure 12:
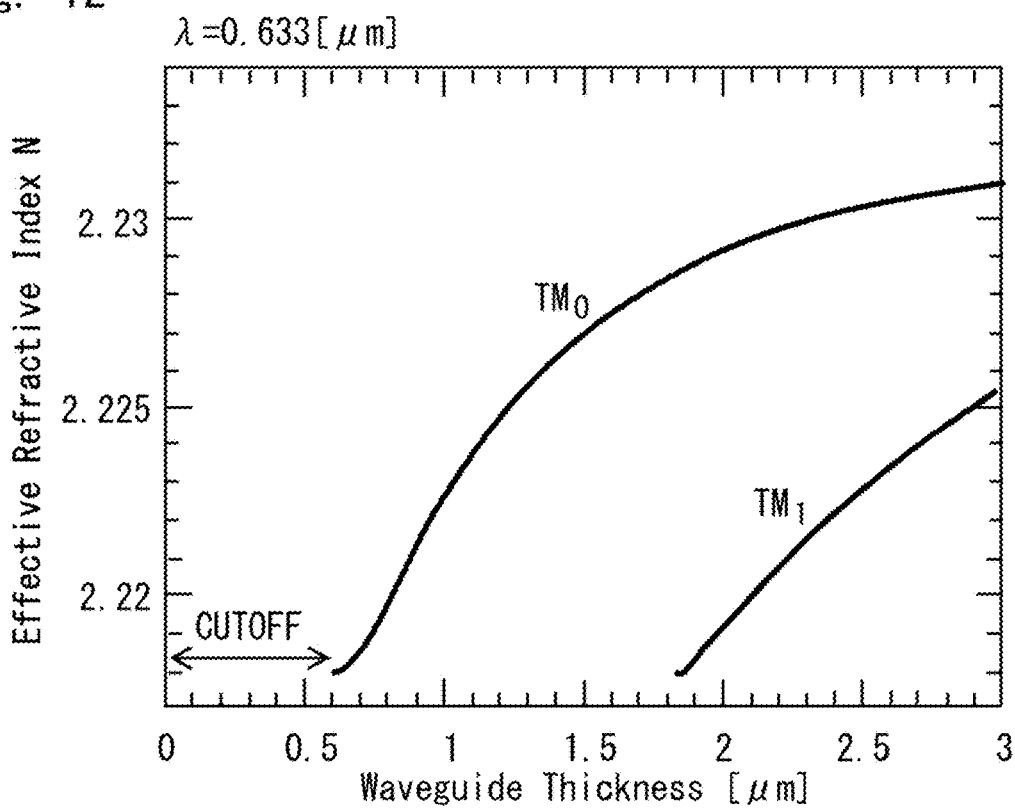
FIG. 12 is a graph showing an example of the mode dispersion curve of guided light in the optical modulator according to the embodiment, where the horizontal axis represents a thickness of a waveguide, and the vertical axis represents an effective refractive index.
Figure 13:
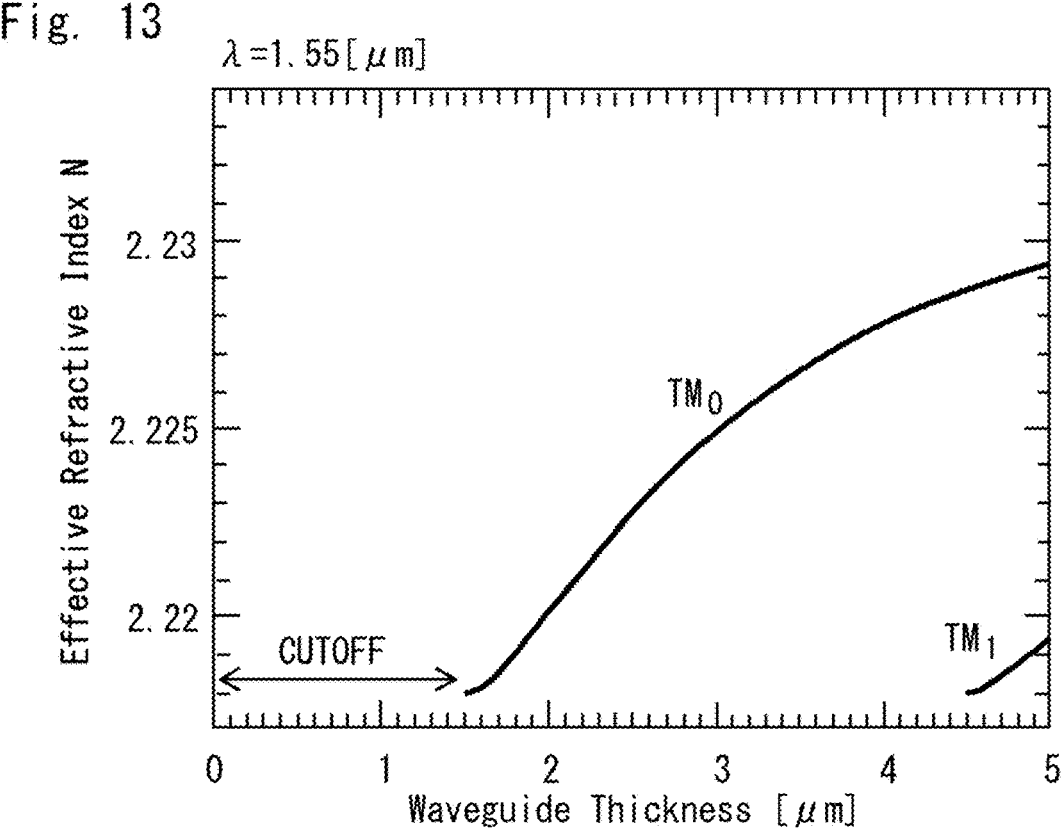
FIG. 13 is a graph showing an example of the mode dispersion curve of guided light in the optical modulator according to the embodiment, where the horizontal axis represents the thickness of the waveguide, and the vertical axis represents the effective refractive index.

FIGS. 12 and 13 are graphs showing an example of the mode dispersion curve of guided light in the optical modulator 1 according to the embodiment. In FIGS. 12 and 13, the horizontal axis represents the thickness H of the waveguide 23, and the vertical axis represents the effective refractive index of the waveguide 23. The wavelength λ of the guided light is 0.633 [μm] in FIG. 12 and 1.55 [μm] in FIG. 13.

As shown in FIG. 12, when the wavelength λ of the guided light is 0.633 [μm], if the thickness H of the 128° YLN substrate serving as the waveguide 23 is smaller than 0.6 [μm], the zero-order mode $TM_0$ does not propagate and is cut off. When the thickness H is larger than 1.8 [μm], the first-mode $TM_1$ is generated. As shown in FIG. 13, when the wavelength λ of the guided light is 1.55 μm, if the thickness of the 128° YLN substrate serving as the waveguide 23 is smaller than 1.5 [μm], the zero-order mode $TM_0$ does not propagate and is cut off. When the thickness H is larger than 4.5 μm, the first-order mode $TM_1$ is generated.

<BPM Analysis Simulation>

Figure 14A:
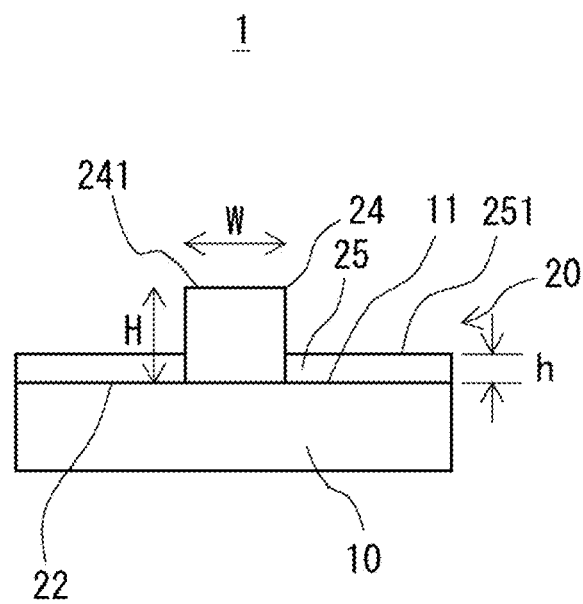
FIG. 14A shows an example of an analysis model when a relationship between the thickness of a slab part and intensity of output light is simulated by a BPM analysis in the optical modulator according to the embodiment.
Figure 14B:
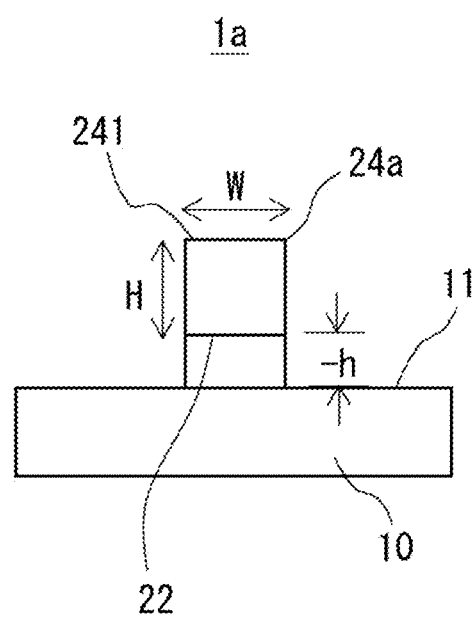
FIG. 14B shows an example of an analysis model when a relationship between the thickness of the slab part and intensity of output light is simulated by a BPM analysis in the optical modulator according to a modified example.

FIGS. 14A and 14B show examples of analysis models when a relationship between a thickness of the slab part 25 and intensity of the output light is simulated by a BPM (Beam Propagation Method) analysis in the optical modulator according to the embodiment and a modified example, respectively. As shown in FIG. 14A, the ridge structure 24 of the optical modulator 1 according to the first embodiment has a width W and a thickness H. A thickness h of the slab part 25 is a length of the slab part 25 between the lower surface 22 of the waveguide substrate 20 and the upper surface 251 of the slab part 25 in the direction orthogonal to the upper surface 11 of the base substrate 10. Note that as shown to FIG. 14B, an optical modulator 1a according to a modified example does not include the slab part 25 except in a ridge structure 24a. In this case, the length from the lower surface 22 of the ridge structure 24a to the upper surface 11 of the base substrate 10 in the direction orthogonal to the upper surface 11 of the base substrate 10, i.e., a thickness of the part remaining between the upper surface 11 of the base substrate 10 and the lower surface 22 of the ridge structure 24a, is denoted by −h.

Figure 15:
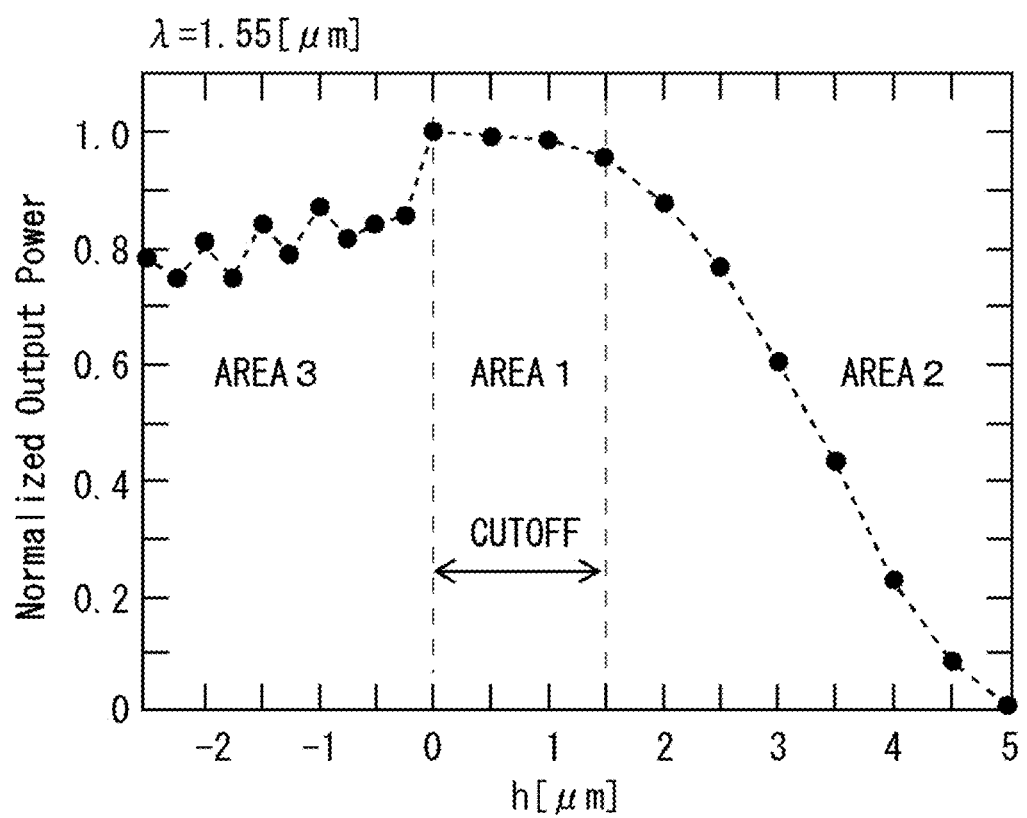
FIG. 15 is a graph showing an example of a simulation result of a relationship between a thickness of a slab part and intensity of output light in the optical modulator according to the embodiment, where the horizontal axis represents the thickness of the slab part, and the vertical axis represents the intensity of normalized output light.

FIG. 15 is a graph showing an example of a simulation result of the relationship between the thickness h of the slab part 25 and the intensity of the output light in the optical modulator 1 according to the embodiment. In FIG. 15, the horizontal axis represents the thickness h of the slab part 25, and the vertical axis represents the intensity of the normalized output light. The wavelength λ of the guided light is 1.55 [μm]. The width W of the ridge structure 24 is 5 [μm], and the thickness H thereof is 5 [μm].

As shown in FIG. 15, in an area 1 where the thickness h of the slab part 25 is 0 to 1.5 μm, the intensity of the normalized output light is 1 or a value close to 1. With the thickness h=0, the intensity of the normalized light output is 1 and is the largest in FIG. 15. In the area 1, the thickness of the slab part 25 indicates the thickness in the range where light is cut off. Thus, the guided light leaking to the slab part 25 can be reduced. Then, the guided light propagates in the ridge structure 24, thereby enhancing the intensity of the output light.

In an area 2 where the thickness h of the slab 25 is 1.5 to 5 [μm], the larger the thickness h of the slab part 25, the smaller the intensity of the normalized output light becomes. In the area 2, the thickness h of the slab part 25 is larger than the thickness of the range where light is cut off. Thus, the guided light leaks to the slab part 25. This means that the intensity of the output light is reduced. In an area 3 where the thickness h of the slab part 25 falls below 0, i.e., in the range of 0 to −2.5 [μm], the intensity of the normalized output light is as low as about 0.8.

As discussed so far, it is preferable to leave the slab part 25 with a thickness h after etching is performed to form the ridge structure 24. Further, the thickness h is preferably within the range where light is cut off. When the thickness h is 0 [μm], the intensity of the output light reaches its maximum value. However, in such a case, the value of the thickness h may be shifted to the area 3. For this reason, it is preferable that the thickness h be a larger than 0 and in the range where light is cut off.

Figure 16A:
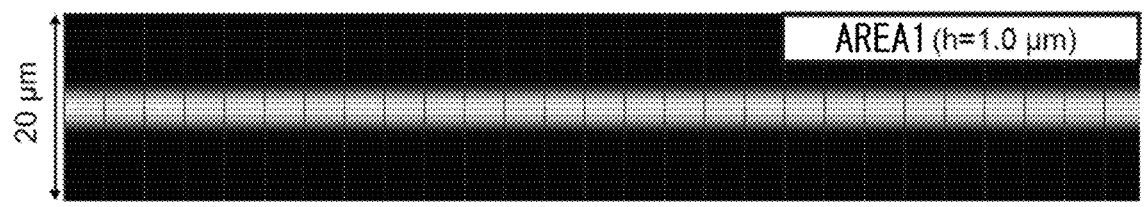
FIG. 16A is a diagram showing an example of a simulation result of an electric field distribution in the optical modulator according to the embodiment and showing a case of an area 1 where the thickness of the slab part is 1.0 [μm]
Figure 16B:
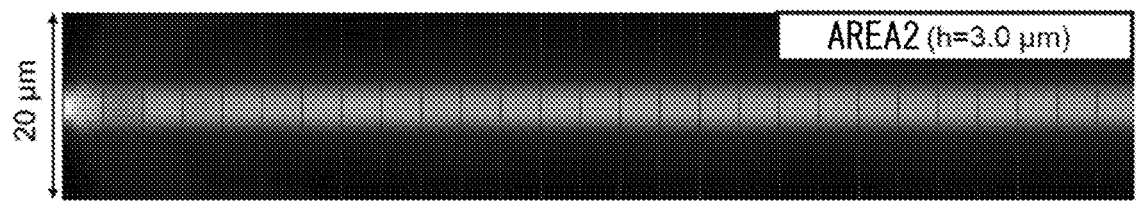
FIG. 16B is a diagram showing an example of a simulation result of an electric field distribution in the optical modulator according to the embodiment and showing a case of an area 2 where the thickness of the slab part is 3.0 [μm]
Figure 16C:
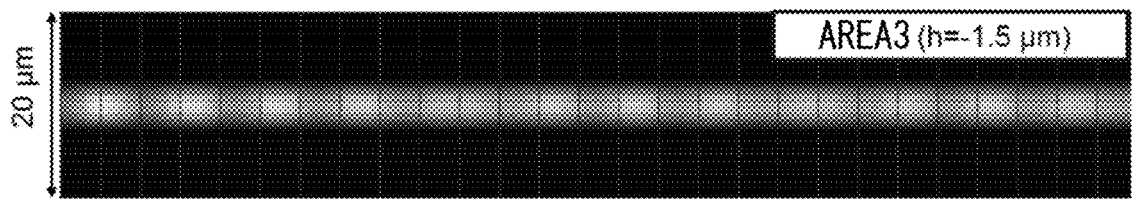
FIG. 16C is a diagram showing an example of a simulation result of an electric field distribution in the optical modulator according to the embodiment and showing a case of an area 3 where the thickness of the slab part is 1.5 [μm]
Figure 17:
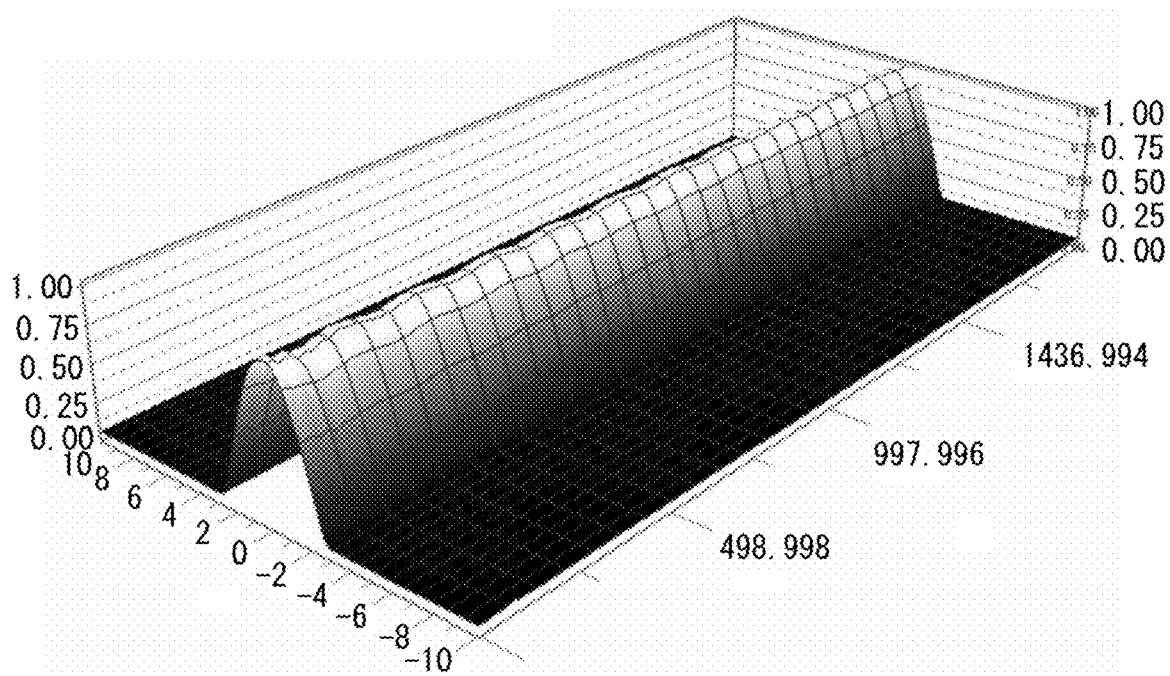
FIG. 17 is a perspective view showing an example of a simulation result of an electric field distribution in the case of the area 1 in the optical modulator according to the embodiment.

FIGS. 16A to 16C are diagrams showing examples of simulation results of an electric field distribution in the optical modulator 1 according to the embodiment. FIG. 16A shows a case of an area 1 where the thickness h of the slab part 25 is 1.0 [μm]. FIG. 16B shows a case of an area 2 where the thickness his 3.0 [μm]. FIG. 16C shows a case of an area 3 where the thickness h is −1.5 [μm]. FIG. 17 is a perspective view showing an example of a simulation result of an electric field distribution in the case of the area 1 in the optical modulator 1 according to the embodiment. The wavelength λ of the guided light used is 1.55 [μm], the width of the base substrate 10 is 20 [μm], and the length of the waveguide 23 is 2000 [μm].

As shown in FIGS. 16A and 17, in the case of the area 1, the electric field is concentrated in the waveguide 23, the leakage of the guided light to a part other than the waveguide 23 is small. Thus, the propagation loss of guided light can be reduced.

On the other hand, as shown in FIG. 16B, in the case of the area 2, since the guided light leaks from the waveguide 23 to the slab part 25, the electric field of the waveguide 23 is low. Thus, the propagation loss of guided light cannot be reduced. As shown in FIG. 16C, in the case of the area 3, the electric field distribution in the waveguide 23 is not uniform, and the propagation of the guided light is unstable. For this reason, the case of the area 1 is preferable. That is, the thickness h of the slab part 25 is preferably larger than 0 and also in a range where light is cut off.

<Manufacturing Method>

Next, a method of manufacturing the optical modulator 1 according to the embodiment will be described. First, a method of manufacturing the substrate 30 for an optical modulator will be described. After that, a method of manufacturing the optical modulator 1 using the substrate 30 for an optical modulator will be described.

<Method of Manufacturing Substrate for Optical Modulator>

Figure 18:
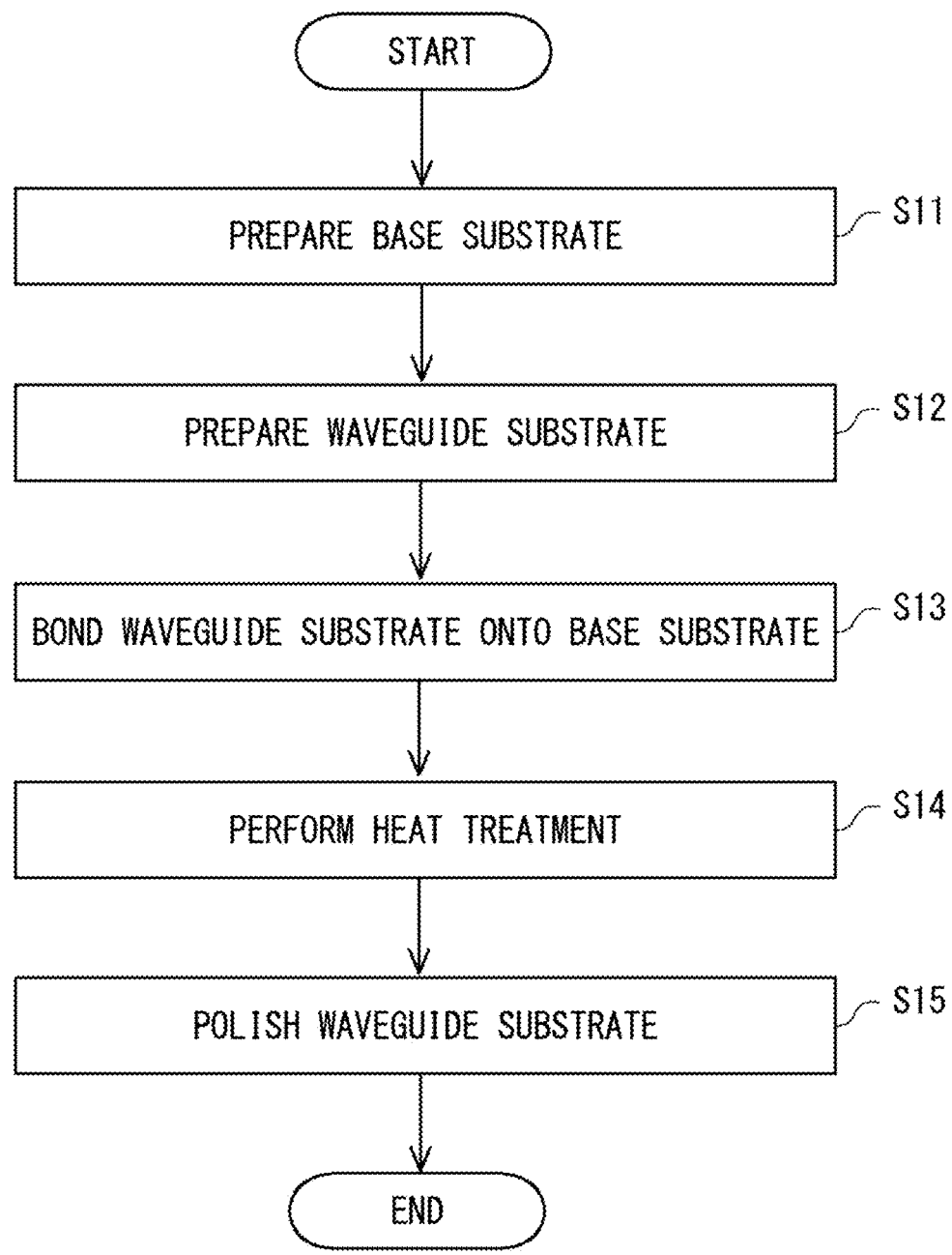
FIG. 18 is a flowchart showing an example of a method of manufacturing the substrate for an optical modulator in the optical modulator according to the embodiment.

FIG. 18 is a flowchart showing an example of the method of manufacturing the substrate 30 for an optical modulator in the optical modulator according to the embodiment. As shown in Step S11 of FIG. 18, the base substrate 10 is prepared. To be more specific, the base substrate 10 made of, for example, lithium niobate is prepared. The crystal cut angle of the base substrate 10 is, for example, 57 [°] to 123 [°], and more preferably 64 [°]. The thickness of the base substrate 10 is, for example, 0.35 [mm].

Next, as shown in Step S12, the waveguide substrate 20 is prepared. To be more specific, the waveguide substrate 20 made of, for example, lithium niobate is prepared. In this way, the base substrate 10 and the waveguide substrate 20 may be made of the same material. The crystal cut angle of the waveguide substrate 20 is, for example, 124 to 132 [°], and preferably 128 [°]. Thus, the crystal cut angle of the base substrate 10 differs from that of the waveguide substrate 20.

The refractive index of the waveguide substrate 20 is made larger than the refractive index of the base substrate 10. For example, the refractive index of the waveguide substrate 20 is made larger than that of the base substrate 10 by making the crystal cut angle of the base substrate 10 different from that of the waveguide substrate 20. In addition, the waveguide substrate 20 having an electro-optic effect is prepared. It is now possible to form a waveguide for performing optical modulation inside the waveguide substrate 20. The thickness of the waveguide substrate 20 is, for example, 0.2 [mm].

Figure 19:
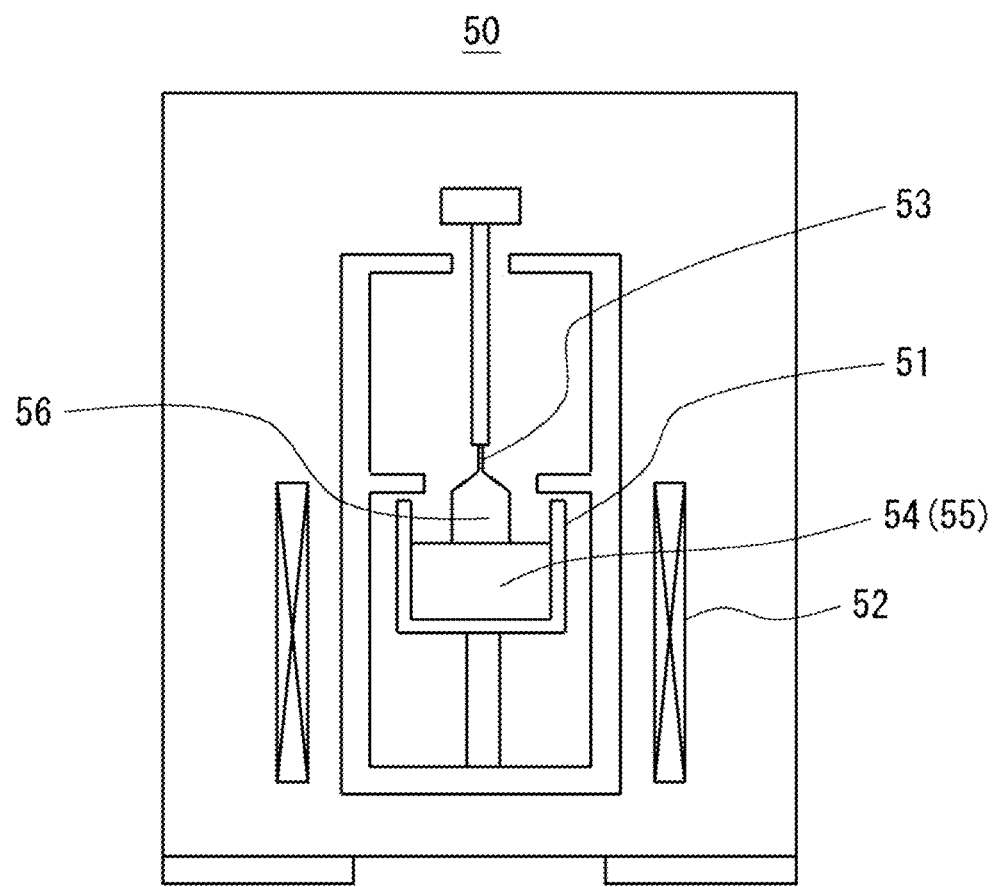
FIG. 19 is a diagram showing an example of a crystal growth apparatus for growing crystals used for the base substrate and the waveguide substrate in the optical modulator according to the embodiment.

FIG. 19 is a diagram showing an example of a crystal growth apparatus for growing crystals used for the base substrate 10 and the waveguide substrate 20 in the optical modulator according to the embodiment. As shown in FIG. 19, crystals used for the base substrate 10 and the waveguide substrate 20 are formed by a crystal growth apparatus 50. The crystal growth apparatus 50 grows crystals by, for example, the Czochralski method (referred to as a CZ method). The crystal growth apparatus 50 includes a crucible 51, a heater 52, and a seed crystal 53. The crucible 51 accommodates a raw material 54 of the crystal to be grown. The heater 52 melts the raw material 54 accommodated in the crucible 51 to form a melt 55. The seed crystal 53 is a base for growing the crystal 56 from the melt 55.

Figure 20A:
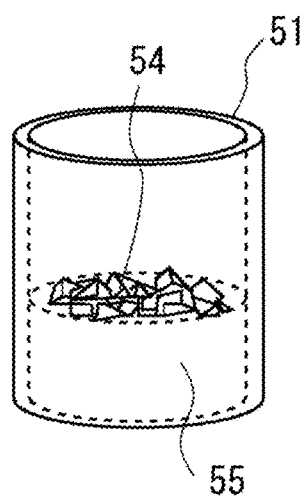
FIG. 20A is a diagram showing an example of a method of growing crystals used for the base substrate and the waveguide substrate in the optical modulator according to the embodiment.

FIGS. 20A to 20E are diagrams showing an example of a method of growing crystals used for the base substrate 10 and the waveguide substrate 20 in the optical modulator 1 according to the embodiment. As shown in FIG. 20A, the raw material 54 of the base substrate 10 is introduced into the crucible 51. Then, the crucible 51 is heated using the heater 52. Next, the raw material 54 introduced in in the crucible 51 is melted, and the melt 55 is formed.

Figure 20B:
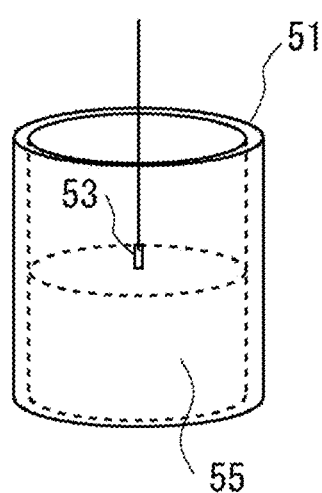
FIG. 20B is a diagram showing an example of the method of growing crystals used for the base substrate and the waveguide substrate in the optical modulator according to the embodiment.

Next, as shown in FIG. 20B, the seed crystal 53 is brought into contact with the melt 55 formed in the crucible 51. For example, a crystal having a plane orthogonal to the 64° Y direction is used as the seed crystal 53. Then, the surface orthogonal to the 64° Y direction is brought into contact with the upper surface of the melt 55. In this way, an ingot crystal extending in the 64° Y direction can be grown. In addition, a crystal having a plane orthogonal to the 128° Y direction is used as the seed crystal. Then, the surface orthogonal to the 128° Y direction is brought into contact with the upper surface of the melt 55. In this manner, an ingot crystal extending in the 128° Y direction can be grown.

The seed crystal is not limited to a crystal having a plane orthogonal to the 64° Y direction and a plane orthogonal to the 128° Y direction. Further, the ingot crystal to be grown is not limited to a crystal extending in the 64° Y direction and the 128° Y direction. The 64° YLN substrate and the 128° YLN substrate may be cut from an ingot crystal extending in any direction other than the 64° Y direction and the 128° Y direction. However, in such a case, there will be more parts of the ingot crystal not used for the substrate than when an ingot crystal extending in the 64° Y direction and the 128° Y direction is used. For this reason, it is desirable to grow an ingot crystal extending in the 64° Y direction and the 128° Y direction.

Figure 20C:
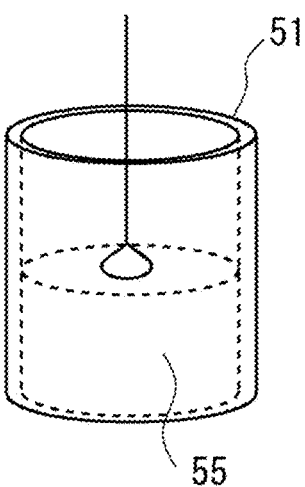
FIG. 20C is a diagram showing an example of the method of growing crystals used for the base substrate and the waveguide substrate in the optical modulator according to the embodiment.
Figure 20D:
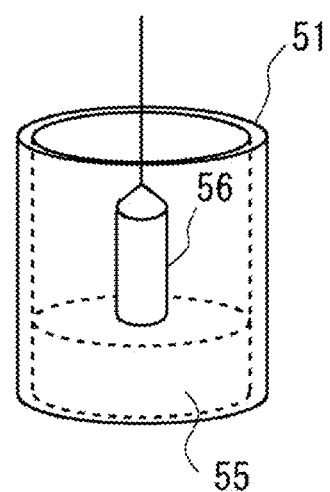
FIG. 20D is a diagram showing an example of the method of growing crystals used for the base substrate and the waveguide substrate in the optical modulator according to the embodiment.

Next, as shown in FIG. 20C, the seed crystal 53 is slowly raised while being rotated. Further, the pulling speed and the like are controlled to achieve a desired diameter. For example, the diameter of the ingot is made larger than φ4 [inch]. Next, as shown in FIG. 20D, the crystal 56 is pulled up from the melt 55 while the desired diameter is maintained.

Figure 20E:
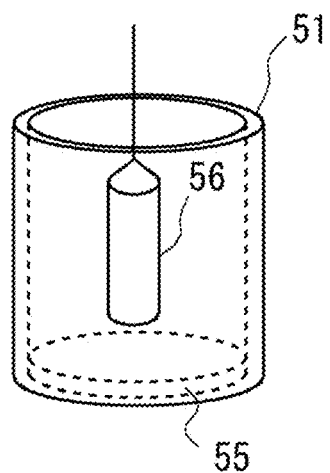
FIG. 20E is a diagram showing an example of the method of growing crystals used for the base substrate and the waveguide substrate in the optical modulator according to the embodiment.

Next, as shown in FIG. 20E, the crystal 56 is separated from the melt 55 when the desired length is reached. In this manner, a single crystal in the same orientation as that of the seed crystal 53 can be obtained.

Figure 21A:
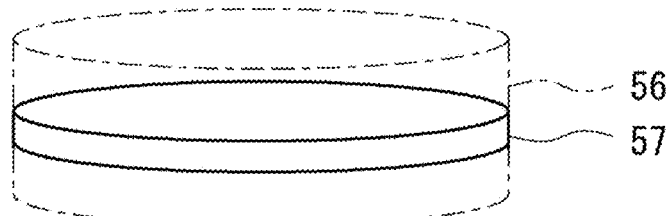
FIG. 21A is a diagram showing an example of a method of processing the base substrate and the waveguide substrate in the optical modulator according to the embodiment.

FIGS. 21A to 21E are diagrams showing an example of a method of processing the base substrate 10 and the waveguide substrate 20 in the optical modulator according to the embodiment. As shown in FIG. 21A, an outer periphery of the crystal 56 is ground so that the diameter of the ingot-shaped crystal 56 becomes uniform. Then, the crystal 56 is sliced into a wafer having a thickness of 1 mm or less using, for example, a wire saw.

Figure 21B:
FIG. 21B is a diagram showing an example of the method of processing the base substrate and the waveguide substrate in the optical modulator according to the embodiment.
Figure 21C:
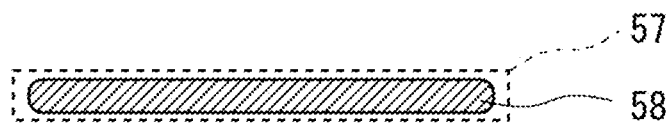
FIG. 21C is a diagram showing an example of the method of processing the base substrate and the waveguide substrate in the optical modulator according to the embodiment.
Figure 21D:
FIG. 21D is a diagram showing an example of the method of processing the base substrate and the waveguide substrate in the optical modulator according to the embodiment.

Then, a sliced wafer 57 as shown in FIG. 21B is formed. Next, as shown in FIG. 21C, the sliced wafer 57 is lapped so that a thickness thereof becomes a predetermined thickness while arranging both surfaces of the sliced wafer 57 to be in parallel. Then, a lapped wafer 58 is formed. Next, as shown in FIG. 21D, chemical etching is performed to remove a layer affected by machining. Then, an etched wafer 59 is formed.

Figure 21E:
FIG. 21E is a diagram showing an example of the method of processing the base substrate and the waveguide substrate in the optical modulator according to the embodiment.

Next, as shown in FIG. 21E, for example, Chemical Mechanical Polishing (referred to as CMP) using colloidal silica abrasive is performed on the wafer in order to smooth the projections and depressions on the surface of the wafer and to achieve a mirror surface with a high level of flatness. The wafer is then cleaned and inspected to thereby obtain a wafer. In this way, the base substrate 10 and the waveguide substrate 20 are prepared.

Next, as shown in Step S13 of FIG. 18, the waveguide substrate 20 is bonded onto the base substrate 10. For example, the waveguide substrate 20 and the substrate 10 are adjusted so that the upper surface 11 of the base substrate 10 and the lower surface 22 of the waveguide substrate 20 are aligned to face each other. Then, the upper surface 11 of the base substrate 10 and the lower surface of the waveguide substrate 20 are overlapped and bonded to each other. After the bonding, the base substrate 10 and the waveguide substrate 20 may be covalently bonded to each other. It is desirable that the base substrate 10 and the waveguide substrate 20 be bonded to each other in a low vacuum. The upper surface 11 of the base substrate 10 and the lower surface 22 of the waveguide substrate 20 may be overlapped and then the waveguide substrate 20 may be pressed against the base substrate 10 later.

Next, as shown in Step S14 of FIG. 18, the base substrate 10 and the waveguide substrate 20 are heat-treated. For example, a heat treatment may be performed for about eight hours at a temperature of 100 to 150 [° C.] on the base substrate 10 and waveguide substrate 20 that are bonded to each other. This enhances the bonding strength. The temperature and the duration of the heat treatment are optimized in accordance with the characteristics of the base substrate 10 and the waveguide substrate 20. In addition, edges may be trimmed to prevent the bonded substrates from coming off from each other.

Next, as shown in Step S15 of FIG. 18, the waveguide substrate 20 is polished. To be more specific, the upper surface 21 of the waveguide substrate 20 is ground so that the thickness of the waveguide substrate 20 becomes a predetermined thickness. For example, the thickness is made 2.5 [μm] or 5 [μm] so that guided light propagates. Then, the upper surface 21 of the waveguide substrate 20 is polished by CMP to be flat. In this manner, the substrate 30 for an optical modulator can be manufactured.

<Method of Manufacturing Optical Modulator>

Figure 22:
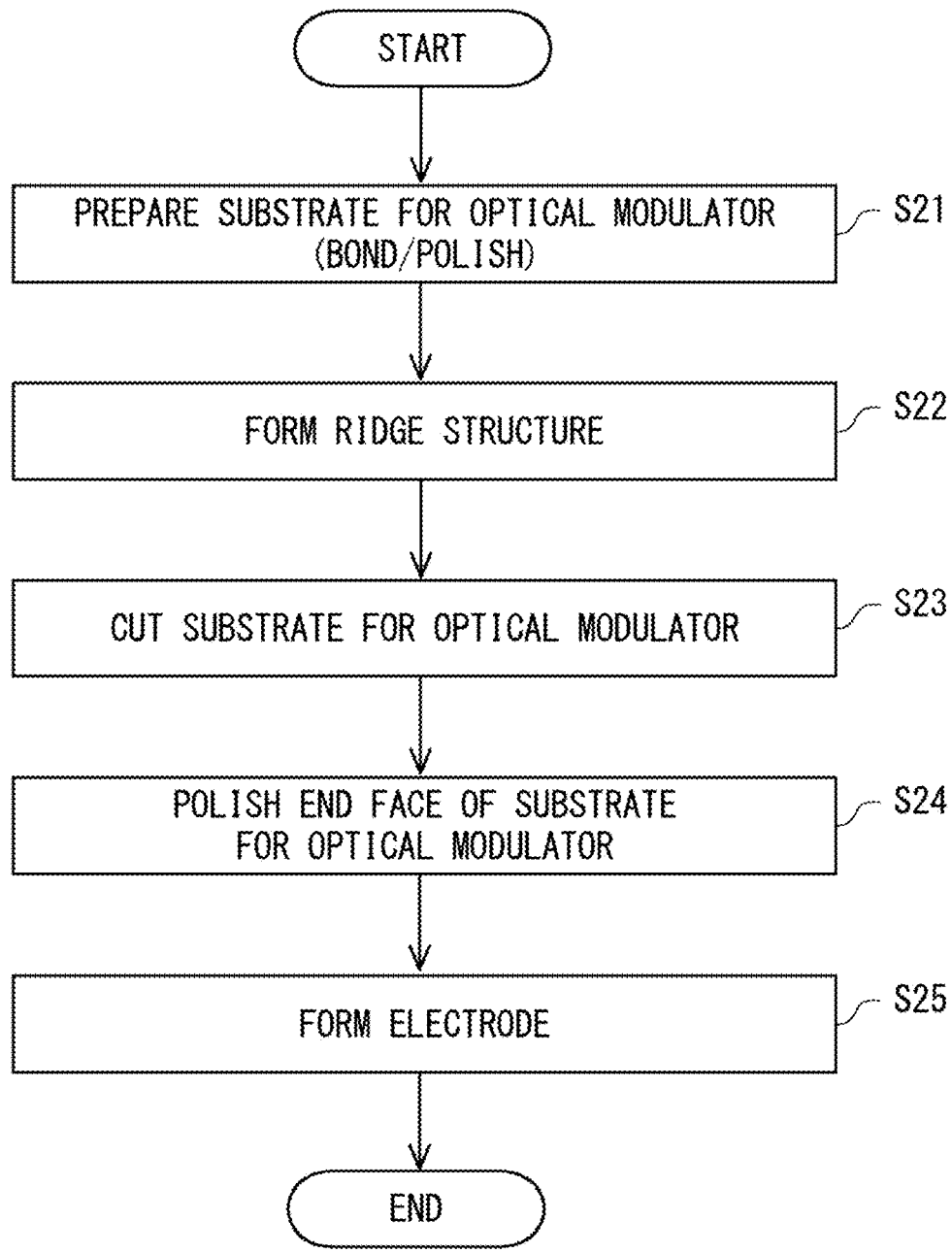
FIG. 22 is a flowchart showing a method of manufacturing the optical modulator according to the embodiment.

Next, a method of manufacturing a modulator using the substrate 30 for an optical modulator will be described. FIG. 22 is a flowchart showing a method of manufacturing the optical modulator 1 according to the embodiment. FIGS. 23A to 23D are processing diagrams showing an example of the method of manufacturing the optical modulator 1 according to the embodiment.

Figure 23A:
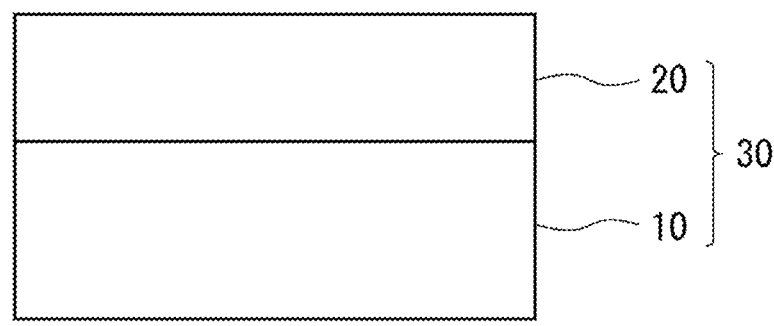
FIG. 23A is a processing diagram showing an example of the method of manufacturing the optical modulator according to the embodiment.
Figure 23B:
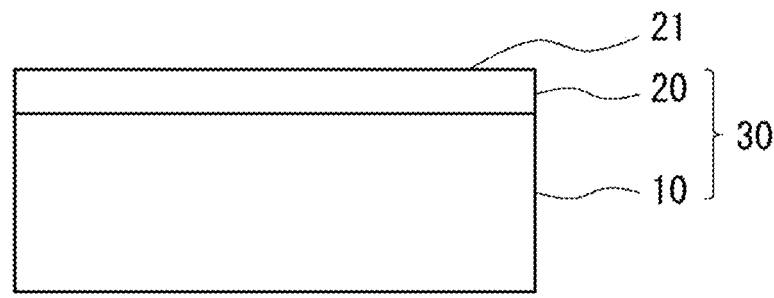
FIG. 23B is a processing diagram showing an example of the method of manufacturing the optical modulator according to the embodiment.

As shown in Step S21 of FIG. 22 and FIG. 23A, the substrate 30 for an optical modulator is prepared. Specifically, the substrate 30 for an optical modulator formed by bonding the waveguide substrate 20 having the electro-optic effect onto the base substrate 10 is prepared. Note that, as shown in FIG. 23B, the substrate 30 for an optical modulator may be obtained by polishing the upper surface 21 of the waveguide substrate 20 after the waveguide substrate 20 is bonded onto the base substrate 10.

Figure 23C:
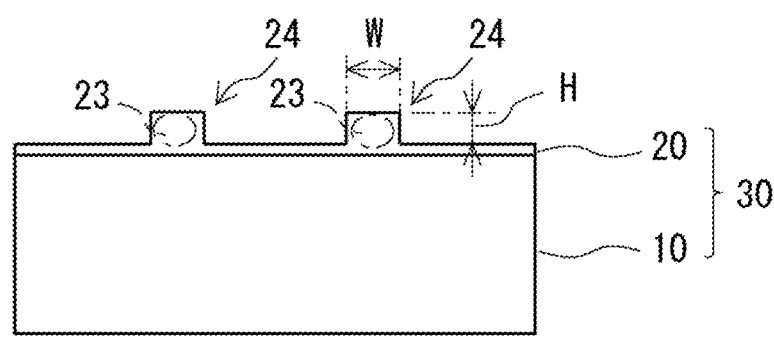
FIG. 23C is a processing diagram showing an example of the method of manufacturing the optical modulator according to the embodiment.

Next, as shown in Step S22 of FIG. 22 and FIG. 23C, the ridge structure 24 is formed. To be more specific, the ridge structure 24 to be the waveguide 23 for performing optical modulation is formed on the waveguide substrate 20. For example, a mask on which a pattern of the ridge structure 24 is formed is disposed over the waveguide substrate 20 to perform etching to thereby form the ridge structure 24. The etching may be performed, for example, by ion milling. When the ridge structure 24 is formed, the waveguide 23 is made to have a width W and a thickness H that allow guided light to propagate. For example, the width W and thickness H of the ridge structure 24 are optimized by a simulation. For example, the width W of the ridge structure 24 may be 5 [μm], and the thickness H thereof may be 5 [μm].

Figure 23D:
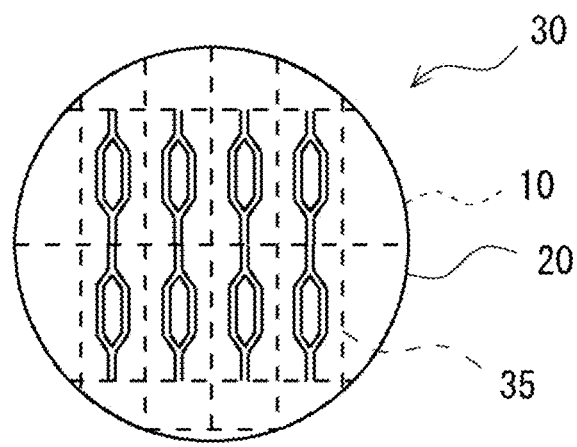
FIG. 23D is a processing diagram showing an example of the method of manufacturing the optical modulator according to the embodiment.

Next, as shown in Step S23 of FIG. 22 and FIG. 23D, the substrate 30 for an optical modulator is cut. More specifically, the wafer-shaped substrate 30 for an optical modulator is cut along the cutting lines 35. Next, as shown in Step S24 of FIG. 22, an end face of the substrate 30 for an optical modulator is polished. More specifically, the end face of the cut chip-shaped substrate 30 for an optical modulator is polished so that the input terminal 26 and the output terminal 27 can be connected to the waveguide 23.

Next, as shown in Step S25 of FIG. 22, the electrode 40 is formed. To be more specific, for example, the electrode 40 for applying a voltage to the waveguide 23 is formed over the ridge structure 24. After that, the optical modulator 1 is manufactured through predetermined processing such as forming wiring to the electrode 40 and forming of the input terminal 26 and output terminal 27.

Next, the effects of this embodiment will be described.

In the optical modulator 1 according to this embodiment, the base substrate 10 and the waveguide substrate 20 made of the same material are used. It is thus possible to reduce a difference between the refractive index of the waveguide substrate 20 and that of the base substrate 10 while making the refractive index of the waveguide substrate 20 larger than the refractive index of the base substrate 10. Consequently, a total reflection angle of the light propagating inside the waveguide can be made small, thereby reducing a propagation loss. Moreover, since no impurity such as titanium is required to form the waveguide 23, it is possible to reduce a propagation loss caused by the impurity.

Additionally, a large electro-optic constant in the waveguide substrate 20 can be used, which reduces a drive voltage. For example, by using a 128° YLN substrate ($r_{33}$=33.6×10$^{-12}$ [m/V]) as the waveguide substrate 20, an efficiency can be improved by as much as 9% as compared with a Z-cut substrate ($r_{33}$=30.8×10$^{-12}$ [m/V]). Furthermore, an electro-optic effect from the base substrate 10 can also be received by using, as the base substrate 10, a 64° YLN substrate made of the material same as that of the waveguide substrate 20, and thus a larger electro-optic effect can be obtained.

Further, by forming the waveguide 23 inside the ridge structure 24, it is possible to propagate the guided light of the single mode TM$_0$. For example, the intensity of the output light can be increased by controlling the width W and the thickness H of the ridge structure 24. Moreover, leakage of the guided light to a part other than the waveguide 23 can be reduced.

The refractive index of the waveguide substrate 20 can be made larger than the refractive index of the base substrate 10 by making the crystal cut angle of the base substrate 10 different from the crystal cut angle of the waveguide substrate 20. By doing so, a desired refractive index and a desired value of the electro-optic constant can be obtained.

The waveguide 23 can be formed by bonding the base substrate 10 to the waveguide substrate 20. This eliminates the need for a heat treatment at a high temperature for a long time in order to diffuse titanium or the like, thereby effectively preventing an introduction of an impurity which causes a propagation loss of the guided light. In addition, the manufacturing cost for the heat treatment at high temperature for a long time can be reduced. Further, the need for the manufacturing cost for epitaxial growth can be eliminated, because it is not necessary to epitaxially grow the waveguide substrate 20 over the base substrate 10.

The bonding strength can be enhanced by covalently bonding the base substrate 10 to the waveguide substrate 20. Furthermore, by using the same material for the base substrate 10 and the waveguide substrate 20 minimizes stress strain at the time of bonding, stronger bonding can be achieved without warpage or cracking of the substrate. Therefore, it is possible to, for example, accurately polish the upper surface 21 of the waveguide substrate 20 and process the ridge structure.

Although the present disclosure made by the present inventor has been described in detail based on the embodiments, the present disclosure is not limited by the above embodiments and can be changed in various ways without departing from the gist thereof as a matter of course.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An optical modulator comprising:
   a base substrate;
   a waveguide substrate disposed over the base substrate and including an electro-optic effect;
   a waveguide formed on the waveguide substrate for performing optical modulation; and
   an electrode configured to apply a voltage to the waveguide, wherein
   the base substrate and the waveguide substrate are made of the same material,
   the waveguide is formed inside the waveguide substrate,
   a refractive index of the waveguide substrate is larger than a refractive index of the base substrate, and
   a crystal cut angle of the base substrate differs from a crystal cut angle of the waveguide substrate.

2. The optical modulator according to claim 1, wherein the waveguide substrate includes a ridge structure,
   the waveguide is formed inside the ridge structure, and
   the electrode is disposed over the ridge structure.

3. The optical modulator according to claim 1, wherein the base substrate and the waveguide substrate are made of lithium niobate.

4. The optical modulator according to claim 3, wherein the crystal cut angle of the base substrate is 57 [°] to 123 [°], and
   the crystal cut angle of the waveguide substrate is 124 [°] to 132 [°].

5. The optical modulator according to claim 4, wherein the crystal cut angle of the base substrate is 64 [°], and
   the crystal cut angle of the waveguide substrate is 128 [°].

6. The optical modulator according to claim 1, wherein the base substrate and the waveguide substrate are covalently bonded to each other.

7. A substrate for an optical modulator comprising:
   a first substrate; and
   a second substrate which is disposed over the first substrate, in which a waveguide for performing optical modulation is formed, and which includes an electro-optic effect, wherein
   the first and second substrates are made of the same material,
   a refractive index of the second substrate is larger than a refractive index of the first substrate, and
   a crystal cut angle of the first substrate differs from a crystal cut angle of the second substrate.

8. The substrate for an optical modulator according to claim 7, wherein
   the first substrate and the second substrate are made of lithium niobate.

9. The substrate for an optical modulator according to claim 8, wherein
the crystal cut angle of the first substrate is 57 [°] to 123 [°], and
the crystal cut angle of the second substrate is 124 [°] to 132 [°].

10. The substrate for an optical modulator according to claim 9, wherein
the crystal cut angle of the first substrate is 64 [°], and
the crystal cut angle of the second substrate is 128 [°].

11. The substrate for an optical modulator according to claim 7, wherein
the first substrate and the second substrate are covalently bonded to each other.

12. A method of manufacturing an optical modulator comprising:
(a) preparing a substrate obtained by bonding a second substrate including an electro-optic effect onto a first substrate;
(b) forming a ridge structure to be a waveguide for performing optical modulation on the second substrate; and
(c) forming an electrode for applying a voltage to the waveguide on the ridge structure, wherein
the first and second substrates are made of the same material,
a refractive index of the second substrate is larger than a refractive index of the first substrate, and
a crystal cut angle of the first substrate differs from a crystal cut angle of the second substrate.

13. The method according to claim 12, wherein
the first substrate and the second substrate are made of lithium niobate.

14. The method according to claim 13, wherein
the crystal cut angle of the first substrate is 57 [°] to 123 [°], and
the crystal cut angle of the second substrate is 124 [°] to 132 [°].

15. The method according to claim 14, wherein
the crystal cut angle of the first substrate is 64 [°], and
the crystal cut angle of the second substrate is 128 [°].

16. The method according to claim 12, wherein
the first substrate and the second substrate are covalently bonded to each other.

17. A method of manufacturing a substrate for an optical modulator comprising:
(a) preparing a first substrate;
(b) preparing a second substrate including a refractive index larger than that of the first substrate and including an electro-optic effect; and
(c) bonding the second substrate onto the first substrate, wherein
the first and second substrates are made of the same material,
a waveguide for performing optical modulation can be formed inside the second substrate, and
a crystal cut angle of the first substrate differs from a crystal cut angle of the second substrate.

18. The method according to claim 17 further comprising:
(d) performing a heat treatment on the first and second substrates after (c).

19. The method according to claim 18 further comprising:
(e) polishing the second substrate after (c).

20. The method according to claim 17, wherein
after (c), the first and second substrates are covalently bonded to each other.

21. The method according to claim 17, wherein
the first substrate and the second substrate are made of lithium niobate.

22. The method according to claim 21, wherein
the crystal cut angle of the first substrate is 57 [°] to 123 [°], and
the crystal cut angle of the second substrate is 124 [°] to 132 [°].

23. The method according to claim 22, wherein
the crystal cut angle of the first substrate is 64 [°], and
the crystal cut angle of the second substrate is 128 [°].

* * * * *